(12) United States Patent
Raffle et al.

(10) Patent No.: US 8,947,323 B1
(45) Date of Patent: Feb. 3, 2015

(54) CONTENT DISPLAY METHODS

(76) Inventors: Hayes Solos Raffle, Palo Alto, CA (US);
Adrian Wong, Mountain View, CA
(US); Ryan Geiss, San Jose, CA (US)

( * ) Notice: Subject to any disclaimer, the term of this patent is extended or adjusted under 35 U.S.C. 154(b) by 283 days.

(21) Appl. No.: 13/425,378

(22) Filed: Mar. 20, 2012

(51) Int. Cl.
*G09G 5/00* (2006.01)

(52) U.S. Cl.
USPC ............... 345/8; 345/156; 345/157; 345/158; 715/863

(58) Field of Classification Search
CPC ....... G06F 3/017; G06F 3/0482; G06F 3/048; G06F 3/012; G02B 27/017
USPC ............ 345/7–9, 156–169; 359/630; 715/863
See application file for complete search history.

(56) References Cited

U.S. PATENT DOCUMENTS

| | | | |
|---|---|---|---|
| 5,742,264 A | 4/1998 | Inagaki et al. | |
| 5,900,849 A | 5/1999 | Gallery | |
| 5,991,085 A | 11/1999 | Rallison et al. | |
| 6,184,847 B1* | 2/2001 | Fateh et al. | 345/8 |
| 7,064,670 B2 | 6/2006 | Galperin et al. | |
| 7,148,860 B2 | 12/2006 | Kooi et al. | |
| 7,432,879 B2 | 10/2008 | Schonlau | |
| 7,866,818 B2 | 1/2011 | Schroeder et al. | |
| 2003/0046401 A1* | 3/2003 | Abbott et al. | 709/228 |
| 2005/0212767 A1* | 9/2005 | Marvit et al. | 345/158 |
| 2005/0249049 A1 | 11/2005 | Jarrett et al. | |
| 2006/0097875 A1 | 5/2006 | Ott | |
| 2007/0188461 A1* | 8/2007 | Bells et al. | 345/167 |
| 2007/0242033 A1* | 10/2007 | Cradick et al. | 345/156 |
| 2009/0097689 A1* | 4/2009 | Prest et al. | 381/380 |
| 2009/0243970 A1 | 10/2009 | Kato et al. | |
| 2010/0013739 A1 | 1/2010 | Sako et al. | |
| 2010/0079508 A1 | 4/2010 | Hodge et al. | |
| 2010/0103077 A1 | 4/2010 | Sugiyama et al. | |
| 2010/0138798 A1 | 6/2010 | Wilson et al. | |
| 2010/0167783 A1 | 7/2010 | Alameh et al. | |
| 2010/0216429 A1 | 8/2010 | Mahajan | |
| 2010/0245078 A1 | 9/2010 | Nadkarni et al. | |
| 2010/0259471 A1 | 10/2010 | Takano et al. | |

(Continued)

FOREIGN PATENT DOCUMENTS

| | | |
|---|---|---|
| EP | 2211224 A1 | 7/2010 |
| WO | 02/35880 A2 | 5/2002 |

(Continued)

OTHER PUBLICATIONS

D. Bhatnagar, "Position trackers for Head Mounted Display systems: A survey," Mar. 29, 1993, Retrieved from URL [http://wwwx.cs.unc.edu/~lastra/Courses/COMP006_F2001/Notes/1993_Bhatnagar_Tracking.pdf], Retrieved on Jul. 20, 2011.

(Continued)

*Primary Examiner* — Hong Zhou

(57) ABSTRACT

Methods and systems involving a graphic display in a head mounted display (HMD) are disclosed herein. An exemplary system may be configured to: (1) at a computing system associated with a head-mountable display, receive head-movement data indicative of head movement; (2) use one or more context signals to determine a first activity associated with the head-mountable device; (3) determine a head-movement interpretation scheme corresponding to the first activity; (4) apply the determined head-movement interpretation scheme to determine input data corresponding to the received head-movement data; and (5) provide the determined input data for at least one function of the head-mountable display.

24 Claims, 14 Drawing Sheets

(56) References Cited

U.S. PATENT DOCUMENTS

| | | |
|---|---|---|
| 2010/0308999 A1 | 12/2010 | Chornenky |
| 2010/0315329 A1* | 12/2010 | Previc et al. ................. 345/156 |
| 2011/0001699 A1 | 1/2011 | Jacobsen et al. |
| 2011/0081634 A1* | 4/2011 | Kurata et al. ................. 434/236 |
| 2011/0117970 A1 | 5/2011 | Choi |
| 2011/0128223 A1 | 6/2011 | Lashina et al. |
| 2011/0194029 A1 | 8/2011 | Herrmann et al. |
| 2011/0213664 A1 | 9/2011 | Osterhout et al. |
| 2011/0227820 A1* | 9/2011 | Haddick et al. .............. 345/156 |
| 2011/0231757 A1 | 9/2011 | Haddick et al. |
| 2012/0235902 A1* | 9/2012 | Eisenhardt et al. ........... 345/156 |
| 2012/0287040 A1* | 11/2012 | Moore et al. ................. 345/157 |

FOREIGN PATENT DOCUMENTS

| | | |
|---|---|---|
| WO | 2011044680 A1 | 4/2011 |
| WO | 2011058584 A1 | 5/2011 |

OTHER PUBLICATIONS

C.S. Lin et al., "A novel device for head gesture measurement system in combination with eye-controlled human—machine interface," Optics and Lasers in Engineering, vol. 44, Issue 6, Jun. 2006, pp. 597-614 Retrieved from URL [http://www.sciencedirect.com/science/article/pii/S0143816605001132] Retrieved on Jul. 21, 2011.

* cited by examiner

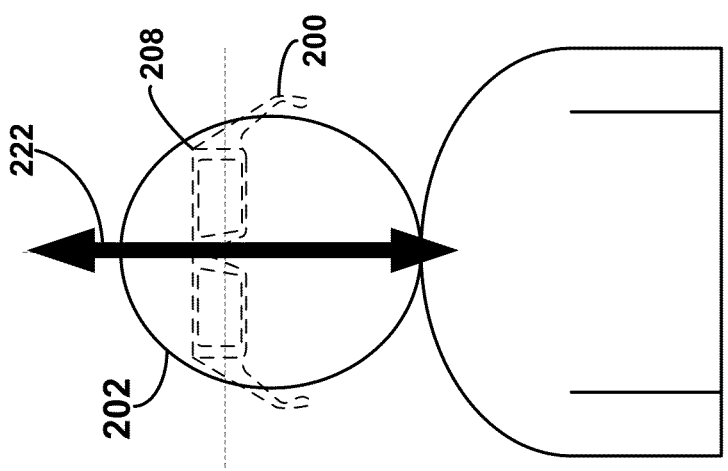
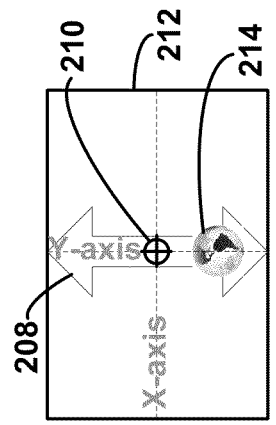
FIG. 2A
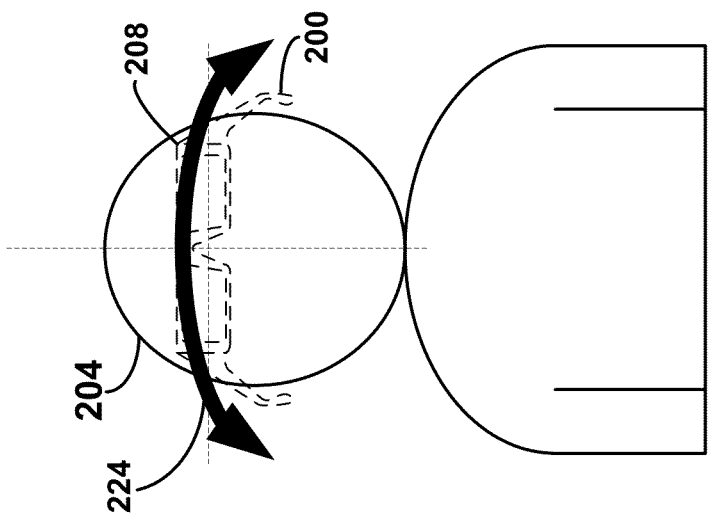
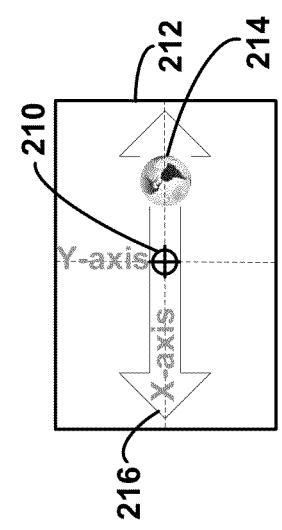
FIG. 2B
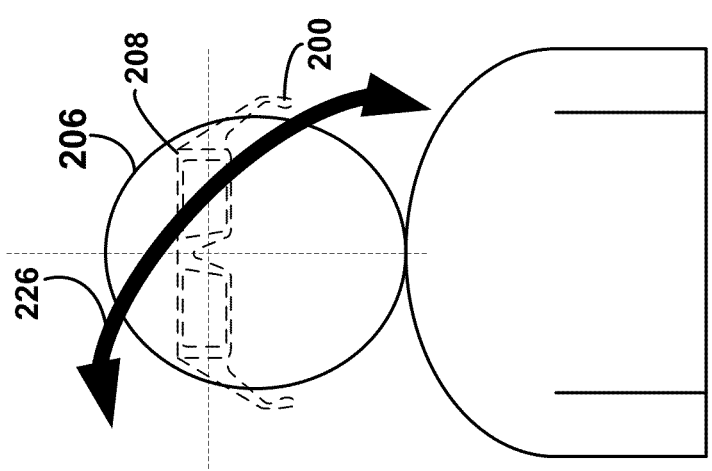
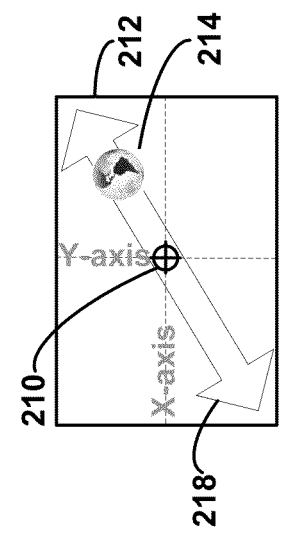
FIG. 2C

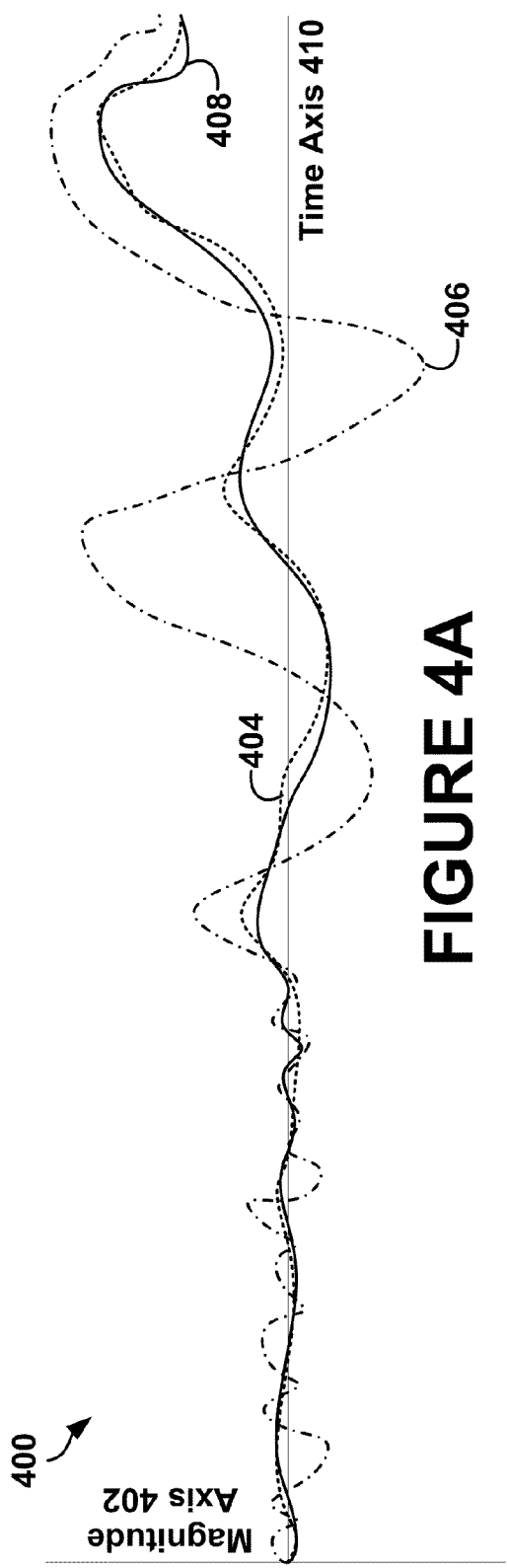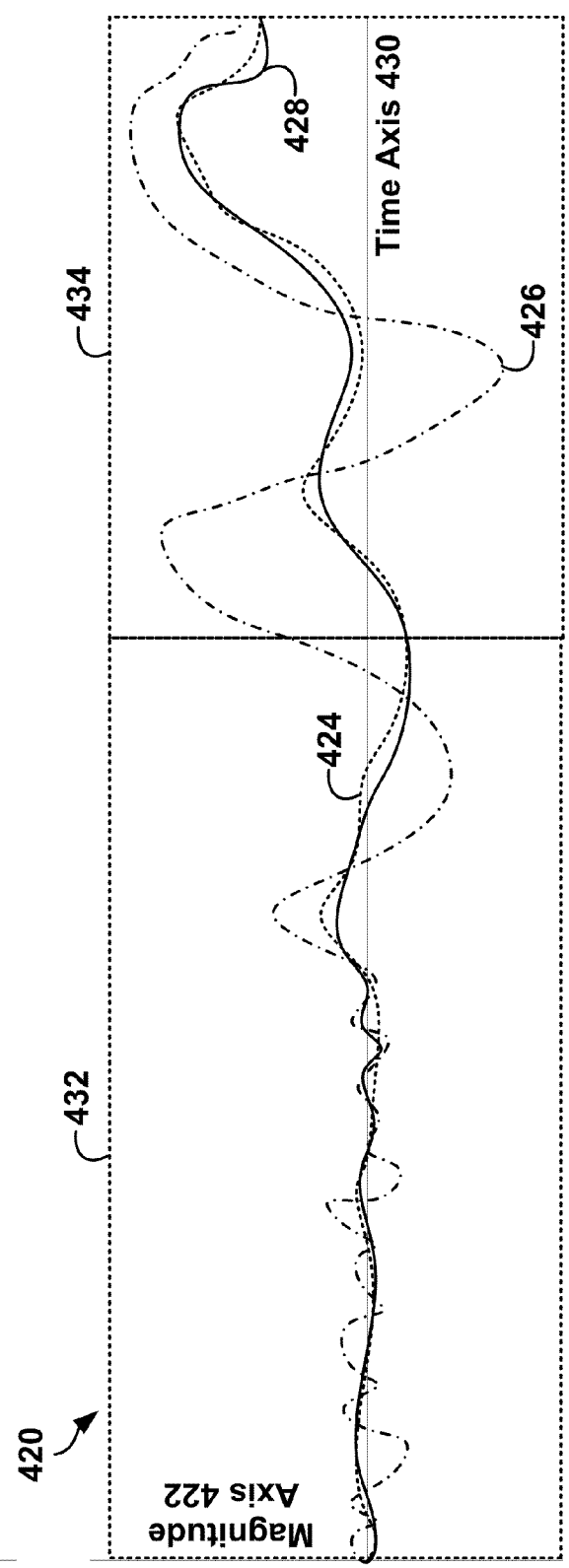

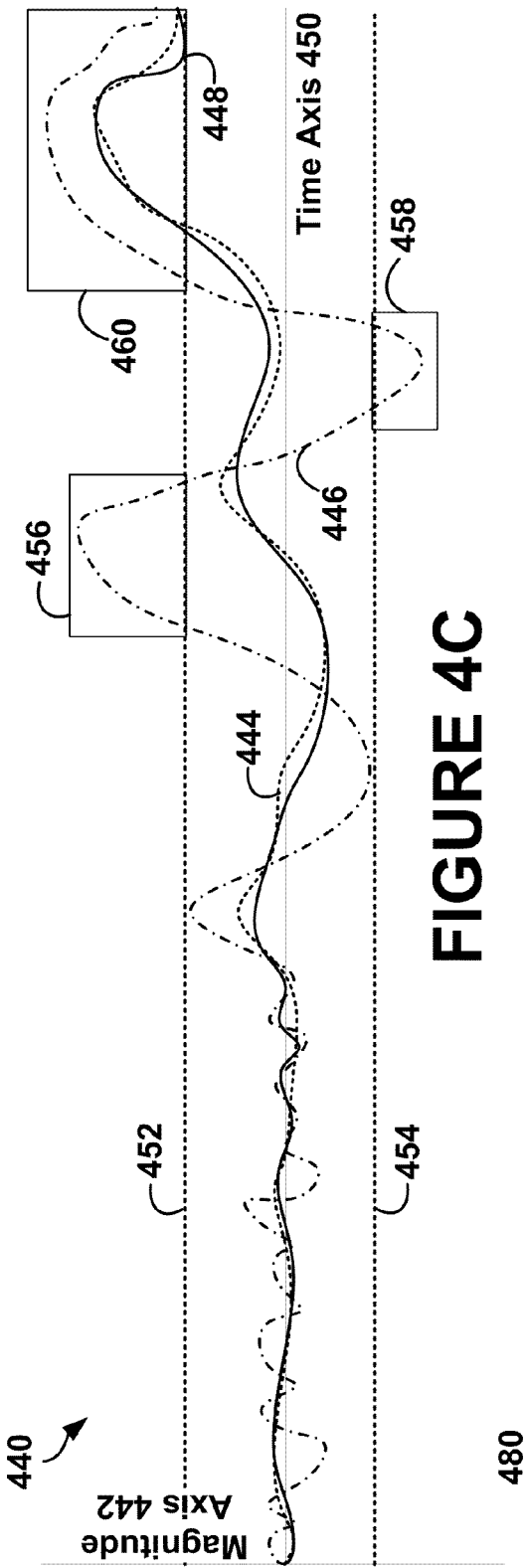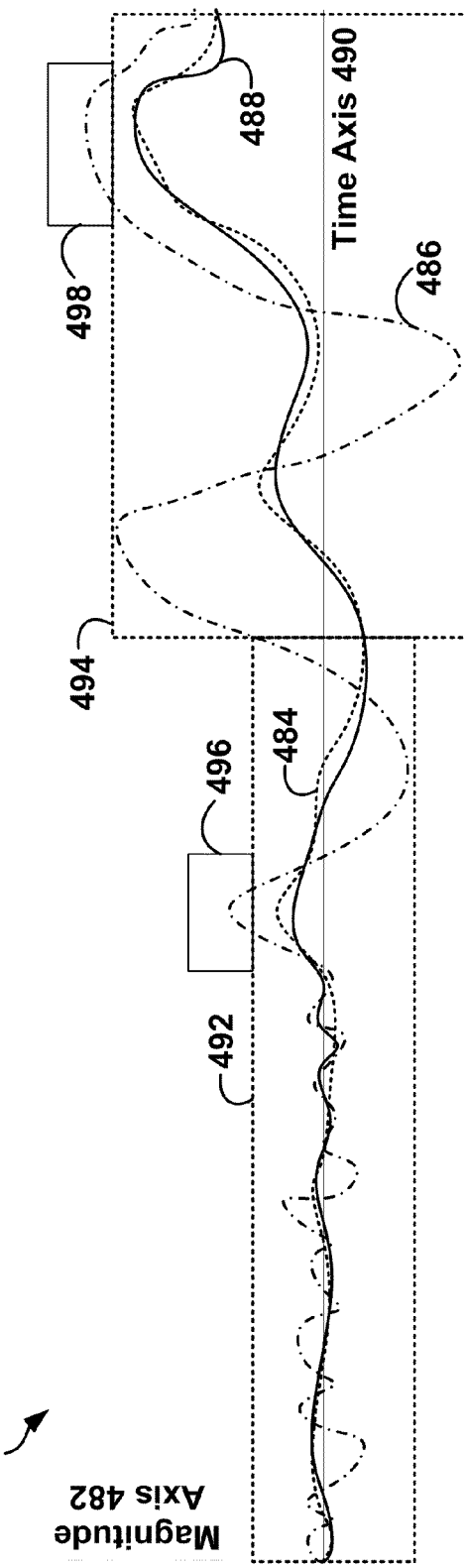

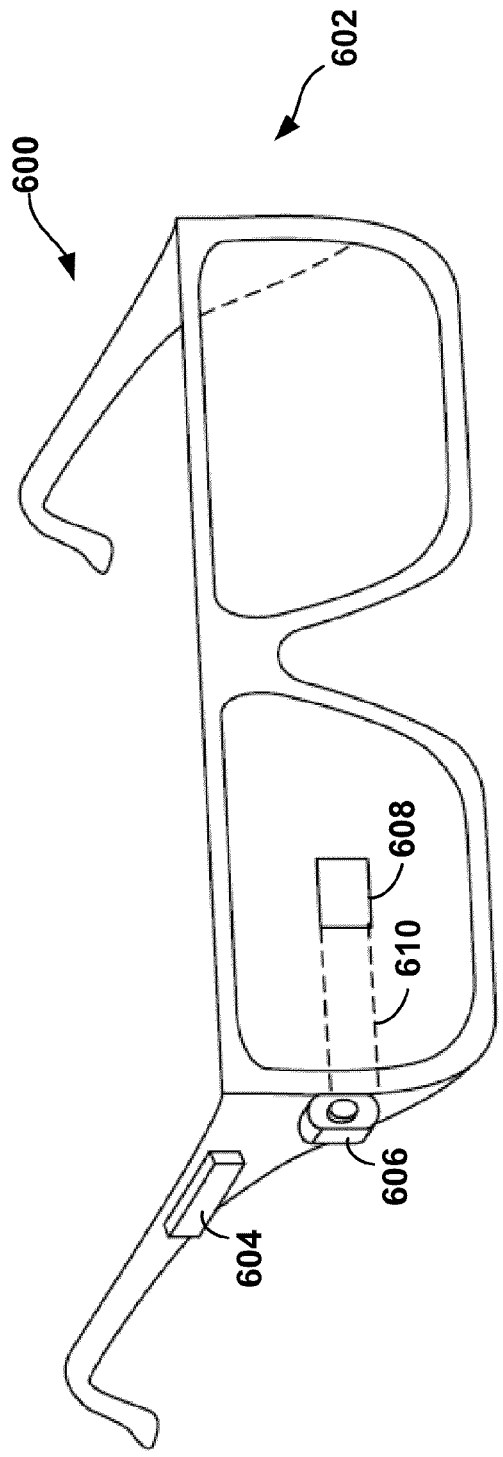
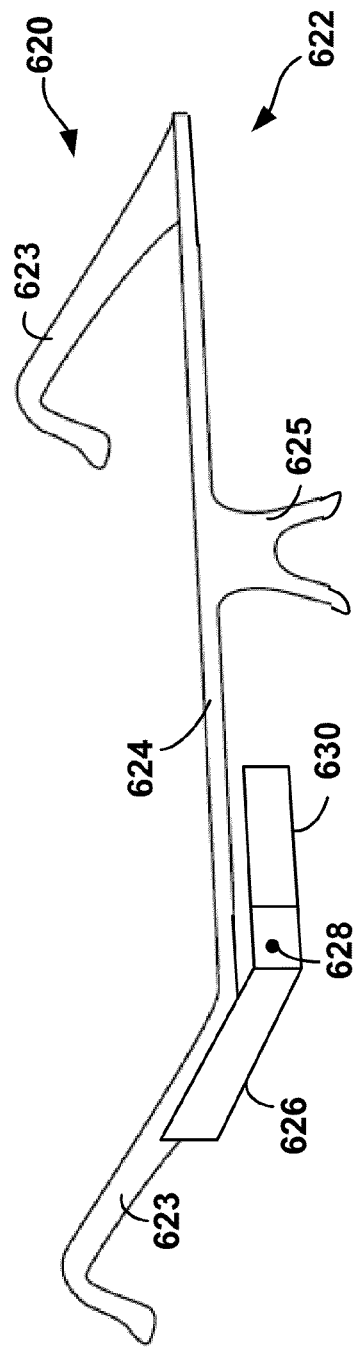
FIG. 6A
FIG. 6B

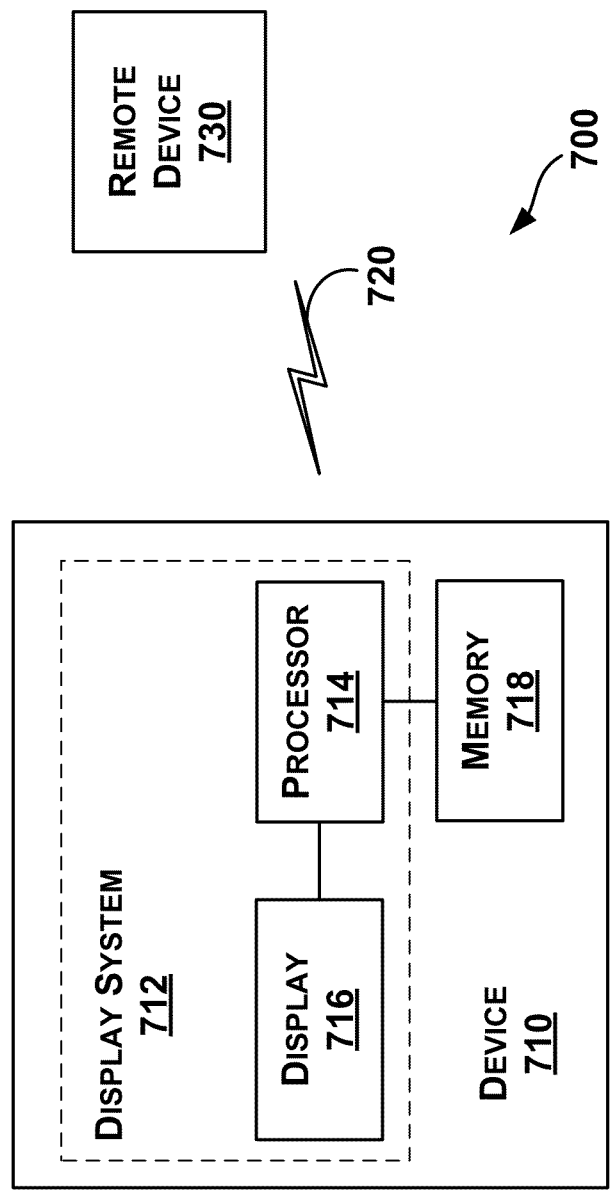

CONTENT DISPLAY METHODS

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

Emerging and anticipated uses of wearable displays include applications in which users interact in real time with an augmented reality. Augmented reality generally refers to a real-time view of a real-world environment that is augmented with additional content. Typically, a user experiences augmented reality through the use of a computing system. The computing system is typically configured to generate the real-time view of the environment, either by allowing a user to directly view the environment or by allowing the user to indirectly view the environment by generating and displaying a real-time representation of the environment to be viewed by the user.

Further, the computing system is typically configured to generate the additional content. The additional content may include, for example, a user-interface through which the user may interact with the computing system. Typically, the computing system overlays the view of the environment with the user-interface, such that the user sees the view of the environment and the user-interface at the same time.

SUMMARY

In one aspect, a computer-implemented method is provided. The computer-implemented method may comprise: (1) at a computing system associated with a head-mountable display, receiving head-movement data indicative of head movement; (2) using one or more context signals to determine a first activity associated with the head-mountable device; (3) determining a head-movement interpretation scheme corresponding to the first activity; (4) applying the determined head-movement interpretation scheme to determine input data corresponding to the received head-movement data; and (5) providing the determined input data for at least one function of the head-mountable display.

In another aspect, a system is provided. The system may include a head-mountable display. The system may be configured for: (1) receiving head-movement data from the head-mountable display indicative of head movement; (2) using one or more context signals to determine a first activity associated with the head-mountable display; (3) determining a head-movement interpretation scheme corresponding to the first activity; (4) applying the determined head-movement interpretation scheme to determine input data corresponding to the received head-movement data; and (5) providing the determined input data for at least one function of the head-mountable display.

In another aspect, a wearable-computing system is provided. The wearable-computing system may include a processor and a non-transitory computer readable medium. The non-transitory computer-readable medium may be configured to store at least program instructions that, when executed by the processor, cause the wearable-computing system to carry out functions comprising: (1) receiving head-movement data indicative of head movement; (2) using one or more context signals as a basis for determining a first activity that is associated with the head-mountable device; (3) determining a head-movement interpretation scheme that corresponds to the first activity; (4) apply the determined head-movement interpretation scheme to determine input data that corresponds to the received head-movement data; and (5) provide the determined input data for at least one function of the head-mountable display.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 2A, 2B, 2C, and 2D are diagrams illustrating body movement, according to an exemplary embodiment.

FIGS. 4A through 4D are diagrams illustrating gyroscopic data corresponding to accelerometer data shown in FIGS. 3A and 3B, according to an exemplary embodiment.

FIG. 6A is a diagram illustrating a second example system for receiving, transmitting, and displaying data, according to an exemplary embodiment.

FIG. 6B is a diagram illustrating a third example system for receiving, transmitting, and displaying data, according to an exemplary embodiment.

FIG. 7 is a simplified block diagram illustrating an example computer network infrastructure, according to an exemplary embodiment.

DETAILED DESCRIPTION

Figure 1:
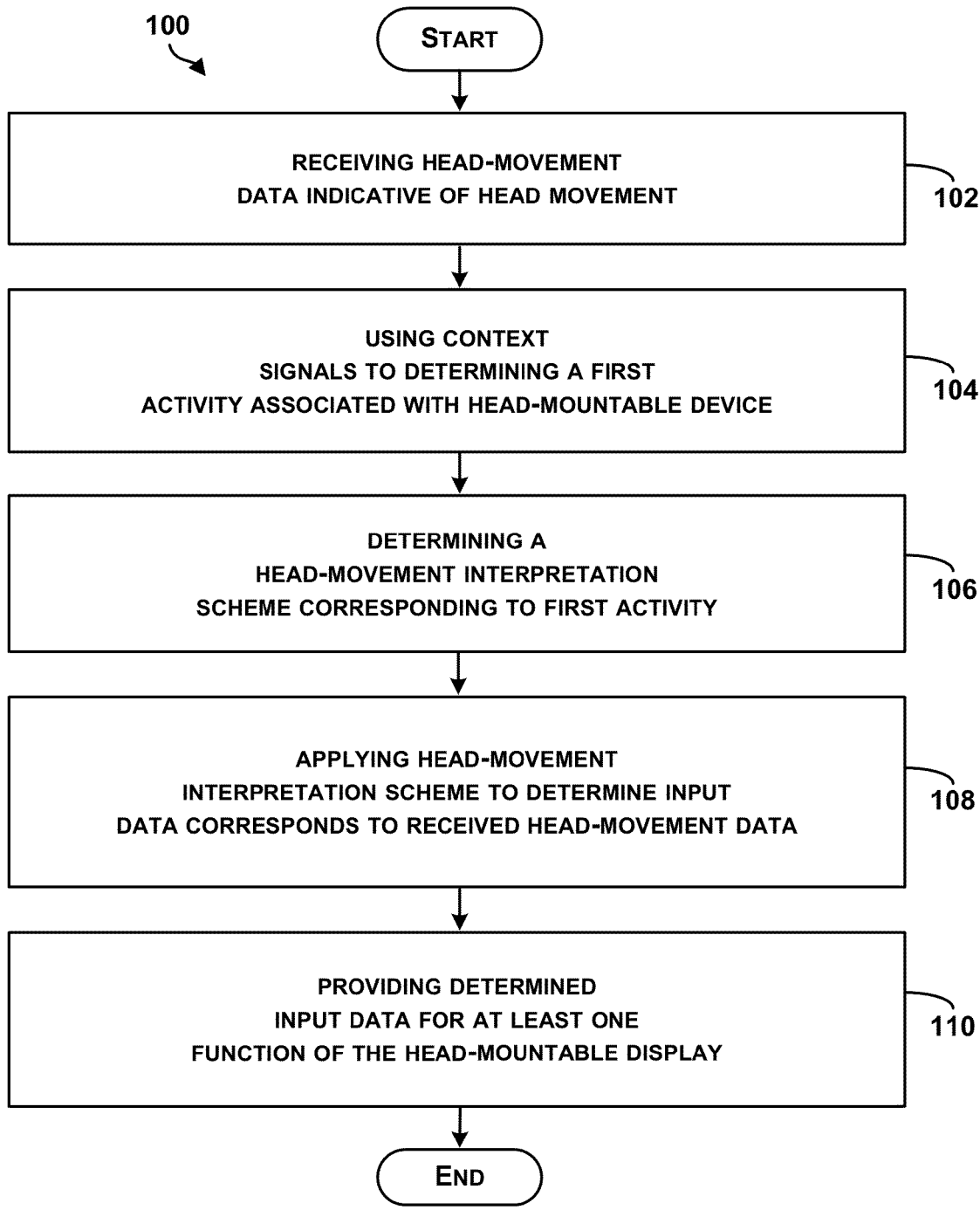
FIG. 1 is a flow chart illustrating a method for determining a movement, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The exemplary embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

A wearable computer may include a graphical display (e.g., such as a head-mounted display (HMD) or heads-up display (HUD)). In addition, a wearable computer may include sensors, such as a gyroscope, an accelerometer, a gravimeter, a camera, and/or a magnetometer, which may detect a wearer's movements. Configured as such, a wearable computer may allow a wearer to provide movement data via body movements to control content shown on the graphical display. Further, a wearable computer may be worn on the head of a user such that the user's head movements may be directed to control movements of graphical content shown on the HMD. Such directed movements may be referred to as "UI-targeted head movements," representative of targeted movements of the head which are directed towards a user-interface.

However, a wearer's head is rarely still. In an exemplary embodiment, the HMD may take the form of or include eyewear that may be worn on a person's face and/or head. Since eyewear may securely fit a wearer's face, the eyewear may closely follow the movements of the wearer. As such, the HMD may be configured to receive data indicative of the slightest movements of the wearer's head regardless of whether the movements are UI-targeted head movements.

Further, while making UI-targeted movements with the HMD, the wearer of the HMD may move their head due to other activities engaged in certain activity (e.g., talking, walking, playing a game, and/or riding on a bus), creating additional head movements that may not be UI-targeted head movements. Consequently, movements of the wearer's head may erroneously move content on the HMD. Thus, exemplary methods and systems may use data from sensors to distinguish between UI-targeted head movements and non-UI-targeted head movements.

Generally, non-UI-targeted head movements may vary depending upon the wearer's activity. As the wearer changes from one activity to another, the accuracy of a static head-movement filter may not provide satisfactory results. Therefore, in an exemplary embodiment, the wearable computer may adjust the sensitivity levels of its motion sensors based on a wearer-activity context to distinguish between UI-targeted and non-UI-targeted head movements. For example, a wearable computer may receive one or more context signals to help determine the wearer-activity context. After identifying the wearer-activity context, the sensors may adjust perhaps based on different "modes of operation" (e.g., bus travelling mode, walking mode, and/or video game mode) to accommodate for the given activity and isolate the UI-targeted head movements.

For instance, the wearer may be on a moving bus while also operating the wearable computer. The wearable computer may determine context signals by recognizing the time of day and/or the wearer's schedule (i.e. 7:15 AM when the wearer typically gets on a bus to go to work), changes in temperature (e.g., from an outdoor environment to an indoor setting), movements of the wearer (e.g., acceleration, velocity, inertia, etc.), location of the wearable computer (e.g., using GPS, WiFi, capacitive sensing, RF ID, and/or other location-determination systems or methods), and other information. Based on these context signals, the wearable computer may determine that the wearer is getting on a moving bus, most likely on their way to work. The sensors on the wearable computer may then detect certain non-UI-targeted head movements associated with riding on a bus (e.g., jitter due to the vibrations of the bus engine, bounces from the bus moving on a bumpy road, etc.). As such, the wearable computer may adjust the settings of its sensors to filter out (e.g., dampen, reduce, attenuate, etc.) any movement data created by the non-UI-targeted head movements associated with the bus. In addition, the wearable computer may also adjust its sensitivity levels to require more recognizable or perhaps more exaggerated UI-targeted head movements to move content on the wearable computer. As such, the wearable computer may identify the UI-targeted head movements and distinguish any other movements accordingly.

B. Exemplary Methods for Receiving Data

FIG. 1 is a flow chart illustrating a method for determining a movement, according to an exemplary embodiment. In FIG. 1, method 100 is described by way of example as being carried out by a wearable computer and possibly a wearable computer that includes a head-mounted display (HMD). However, it should be understood that exemplary methods, such as method 100, may be carried out by a wearable computer without wearing the computer. For example, such methods may be carried out by simply holding the wearable computer using the wearer's hands. Other possibilities may also exist.

Further, exemplary methods, such as method 100, may be carried out by devices other than a wearable computer, and/or may be carried out by sub-systems in a wearable computer or in other devices. For example, an exemplary method may alternatively be carried out by a device such as a mobile phone, which is programmed to simultaneously display a graphic object in a graphic display and also provide a point-of-view video feed in a physical-world window. Other examples are also possible.

As shown by block 102 of FIG. 1, method 100 involves a wearable computer receiving head-movement data that is indicative of head movement. Further, the wearable computer may use one or more context signals as a basis for determining a first activity that is associated with the head-mountable device, as shown by block 104. Yet further, the wearable computer may determine a head-movement interpretation scheme that corresponds to the first activity, as shown by block 106. The wearable computer may also apply the determined head-movement interpretation scheme to determine input data that corresponds to the received head-movement data, as shown by block 108. In addition, the wearable computer may provide the determined input data for at least one function of the head-mountable display, as shown by block 110.

i. Receiving Head-Movement Data

As noted, block 102 of method 100 involves a computing system associated with a head-mountable display receiving head-movement data indicative of head movement. In some embodiments, sensors configured to detect head movement and/or generate corresponding head-movement data may be configured to be part of the computing system and/or a wearable computer.

By way of example and without limitation, example sensors could be any one or more of a motion detector (e.g., a gyroscope, an accelerometer, a gravimeter, a camera, and/or a shock sensor), an impact sensor, a proximity sensor (e.g., capacitive sensing device), a location determination device (e.g., a GPS device), a magnetometer, and an orientation sensor (e.g., a theodolite). Other detection devices or elements may be included within these sensors and other functions may be performed by these sensors to receive movement data. Exemplary embodiments of sensors that may be included in an example computing system are discussed further below with respect to FIGS. 5A and 9A.

In some embodiments, sensory configurations may be used with a wearable computer to receive movement data indicative of body movement. In some embodiments, a wearable computer may include a plurality of sensors to receive movement data corresponding to a wearer's body (e.g., movements of the wearer's head, hand gestures, arm movements, etc.). In some instances, sensors in a wearable computer may receive head-movement data corresponding to movements of a wearer's body (e.g., the wearer's head) while wearing an HMD.

In an exemplary embodiment, the wearable computer may receive a head-movement data from a sensor and move content on a graphical display. In some instances, a wearable computer may display and move a pointer (e.g., a selection icon, cursor, arrow, indicator, reticle, or other graphic icon) in the display of its HMD. In some embodiments, the pointer may include a tip, such as a cursor, to provide an indication of its computational point. In addition, in some instances, the pointer may be a reticle providing a given position (e.g., the center) of a display as its computational point. In some embodiments, the pointer may not provide an indication of its computational point (e.g., may not be visible) and instead, may simply be defined by a position in the graphic display, such as the center of the graphic display.

Further, in some embodiments, the wearable computer may allow a wearer to control the movement of content on the graphical display based on head-movements. For example, in an exemplary embodiment, a pointer displayed by the wearable computer may operate much like a mouse pointer and a graphic object to function similar to a desktop icon on a personal computer. However, such a comparison of aspects of the disclosure herein to other known computing systems is for purposes of example only, and should not be taken to be limiting, as the pointer may take other forms or function in other ways without departing from the scope of the invention.

Figure 2D:
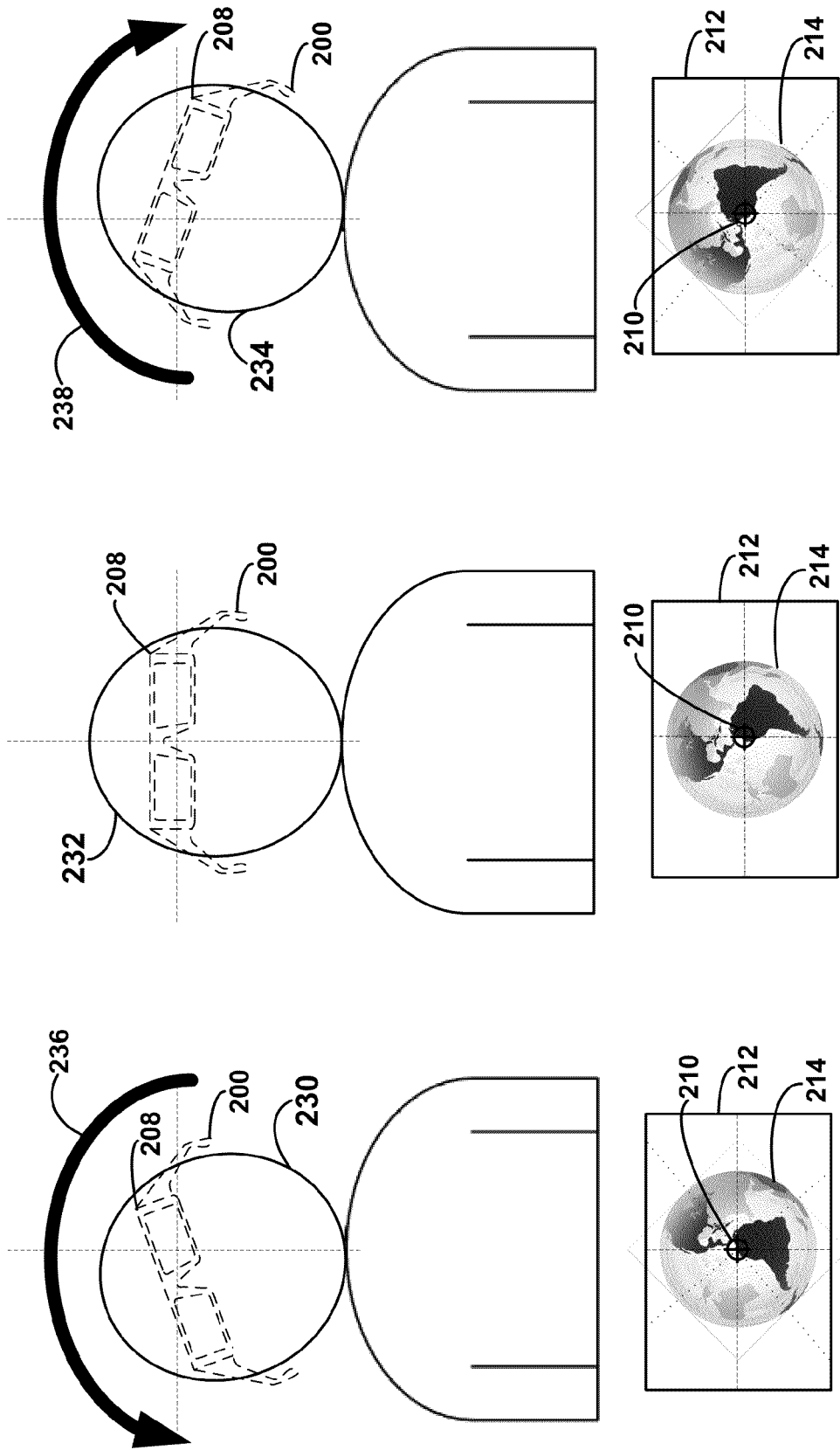

FIGS. 2A, 2B, 2C, and 2D are diagrams illustrating body movement, according to an exemplary embodiment. In FIG. 2A, wearable computer 200 may include sensors 208 to receive head-movement data from vertical rotation 222 of head 202. Further, in FIG. 2B, wearable computer 200 may further utilize sensors 208 to receive movement data from horizontal rotation 224 of head 204. Yet further, in FIG. 2C, wearable computer 200 may further utilize sensors 208 to receive movement data from diagonal rotation 226 of head 206. In FIG. 2D, wearable computer 200 may also utilize sensors 208 to receive movement data associated with tilting motion 236 of head 230 and tilting motion 238 of head 234. Other movements of wearable computer 200 are possible, perhaps detected by use of other sensory devices to receive such data accordingly.

It should be understood that the examples herein are provided for illustration. There may be other head movements and/or techniques for receiving head-movement data not described above, without departing from the scope of the embodiments herein.

ii. Determining Head Movement Data

In some embodiments, body movements may be characterized as UI-targeted movements. Further, in some embodiments, certain types of body movements may be characterized in a respective class of UI-targeted movements. For example, head movements may include UI-targeted head movements, eye movements may include UI-targeted eye movements, arm movements may include UI-targeted arm movements, and gestures may include UI-targeted gestures, amongst other possibilities. Further, in some embodiments, movements that are not identified as UI-targeted movements may be characterized as non-UI-targeted movements.

In an exemplary embodiment, UI-targeted movements may be directed towards moving graphical content on a graphic display. In some instances, UI-targeted movements may be made in a three-dimensional space (x, y, z). Further, data from UI-targeted movements in the three-dimensional space may be mathematically converted to data in a two-dimensional space (x, y), perhaps shown on a graphical display of the wearable computer. For example, software algorithms, including 3D computational language and/or numerical computing environments, amongst other mathematical models, may be utilized to make such conversions.

As such, in some embodiments, UI-targeted movements may be directed to move content on a graphic display. In particular, UI-targeted movements may move content such as a pointer on a two-dimensional graphic display. For example, the pointer may be fixed in one position of the graphic display (e.g., the center of the graphic display) and the UI-targeted movements may cause the graphic display to show portions of a larger navigable area (e.g., additional content in the graphic display). In some embodiments, the pointer may not be fixed to any position in the graphic display and UI-targeted movements may move the pointer relative to the bounds of the graphic display. Other possibilities may also exist.

In some embodiments, UI-targeted movements may be directed at moving content in a particular direction. For example, referring to FIG. 2A, wearable computer 200 may receive movement data associated with vertical rotation 222 of head 202 and responsively cause pointer 210 to move on a vertical path 208 along the Y-axis shown in graphic display 212. In some instances, vertical rotation 222 may be a UI-targeted head movement directed to move pointer 210 towards graphic object 214. In FIG. 2B, wearable computer 200 may receive movement data associated with horizontal rotation 224 of head 204 and responsively cause pointer 210 to move on a horizontal path 216 along the X-axis shown in graphic display 212. In some instances, horizontal rotation 224 may be a UI-targeted head movement directed to move pointer 210 towards graphic object 214.

Further, FIG. 2C shows that wearable computer 200 may receive data associated with diagonal rotation 226 of head 206 and responsively cause pointer 210 to move on a diagonal path 218 with respect to both the X and Y axes in graphic display 212. In some instances, diagonal rotation 226 may be a UI-targeted head movement directed to move pointer 210 towards graphic object 214. It should be noted that diagonal rotation 226 may be in a given direction (e.g., top right to bottom left) from the perspective of the wearer and head 206, which is illustrated as facing out from the page. As such, diagonal path 218 may also be the same direction (e.g., top right to bottom left) when viewing graphic display 212 from the perspective of the wearer, which is illustrated as facing into the page. Therefore, diagonal rotation 226 corresponds to moving pointer 210 along diagonal path 218 in graphic display 212.

In addition, FIG. 2D illustrates that wearable computer 200 may receive data associated with tilting motion 236 of head 230 and responsively cause graphic object 214 to rotate clockwise (according to the wearer's perspective of graphic display 212). Further, FIG. 2D also illustrates that wearable computer 200 may receive data associated with tilting motion 238 of head 234 and responsively cause graphic object 214 to rotate counter-clockwise (according to the wearer's perspective of graphic display 212). In some instances, tilting motion 236 and 238 may be UI-targeted head movements directed to rotate graphic object 214. It should be noted that if wearable computer 200 does not receive data associated with a tilting motion of head 232, graphic object 214 does not rotate. Other possibilities for UI-targeted head movements directing content may also exist.

As noted, one or more sensors may be associated with a wearable computer. In some embodiments, such sensors may be used to determine UI-targeted movement data. In some embodiments, sensitivity parameters may be associated with sensors to distinguish between UI-targeted head movements and non-UI-targeted head movements. For example, a value of a given sensitivity parameter may be associated with the level of sensitivity such that a high value of the given sensitivity parameter represents a high sensitivity level whereas a low value of the given sensitivity parameter represents a low sensitivity level, however, other possibilities may also exist.

For instance, while a wearer is operating the wearable computer at their desk (e.g., in their office), the value corresponding to the sensitivity parameter may be at the highest level (e.g., at a level ten on an example scale from one to ten). The sensitivity level may be high due to low jitter, little to no external vibrations, and/or infrequent unintentional movements, amongst other sources of non-UI-targeted movements. Yet, if the wearer is on a moving bus while operating the wearable computer, non-UI-targeted movements may occur due to the bus's movement, road conditions, and/or due to other bus passengers. As such, the value corresponding to the sensitivity parameter may be very low; e.g., set to two out of the example scale from one to ten.

Further, in some embodiments, a UI-targeted head movement may include a predetermined movement. In some instances, predetermined movements may distinguish UI-targeted movements and non-UI-targeted movements. Further, in some instances, a wearer may make a UI-targeted head movement in accordance with a predetermined head movement for panning, browsing, paginating, and/or scrolling content in the graphic display, among other possibilities. For example, referring back to FIG. 2A, the movement 222 from up to down on vertical path 208 (i.e. tilting wearable computer 200) may be a predetermined head movement. Further, movement 222 may correspond to a UI-targeted head movement for continuous scrolling on a web browser shown on graphic display 212. In some embodiments, the movement 222 may correspond to a UI-targeted head movement for panning between vertically-arranged areas in graphic display 212.

Yet further, flicks of the head and/or tilting wearable computer 200 in a hard nod may be a predetermined movement for pagination, dividing graphical content into discrete pieces, and separating graphical content, amongst other possibilities. In some instances, as shown in FIG. 2B, movement 224 from left to right on horizontal path 216 may be a UI-targeted head movement for browsing through horizontally-arranged graphic objects shown in graphic display 212. In addition, movement 226 may be a UI-targeted head movement for removing content (i.e., slashing through the content) among other possibilities.

In addition, as illustrated in FIG. 2D, tilting motion 236 of head 230 may be a UI-targeted head movement to rotate graphic object 214 clockwise and/or move pointer 210 to the right of graphic object 214 (according to the wearer's perspective of graphic display 212). Further, tilting motion 238 of head 234 may be a UI-targeted head movement to rotate graphic object 214 counterclockwise and/or move pointer 210 to the left of graphic object 214 (according to the wearer's perspective of graphic display 212). Tilting motion 236 and 238 may be differentiated from the other head movements (such as movement 224) and may provide more discrete interactions with content, possibly moving content in a slower manner. In addition, tilting motion 236 and 238 may also be associated with selection commands and/or instructions to view option menus. Other possibilities may also exist.

In some embodiments, sensors may be used remotely with the wearable computer to receive movement data indicative of body movements. In some embodiments, a plurality of remote sensors (possibly implanted in a wearer's body) may be used to receive body-movement data (e.g., data corresponding to the movements of the wearer's neck, arms, hands, chest, waist, legs, feet, etc.) Further, in some instances, sensors may be placed in and/or on objects in proximity to the wearer (e.g., vehicles, clothing, jewelry, accessories, cell phones, purses etc.) to receive movement data. In some instances, sensors in a wearable computer may receive head-movement data corresponding to movements of a wearer's head while other sensors may be used to receive body-movement data corresponding to the wearer's body, such as the wearer's waist. In such instances, head-movement data may be compared to body-movement data to facilitate determining UI-targeted head movements.

For example, consider that a wearer is riding a bus while operating the wearable computer. In some instances, the head-movement data and the body-movement data may include similar data patterns due to the bus's movement, road conditions, and/or other external factors associated with non-UI-targeted head movements. Further, patterns in the head-movement data may be compared to patterns in the body-movement data to facilitate recognizing UI-targeted head movements. For instance, the wearable computer may receive a spike in movement data due to the bus hitting a bump in the road. Further, a remote sensor located on the wearer's waist (possibly attached to their belt) may receive a similar spike in movement data due to the bus hitting the bump. Thus, the wearable computer may identify the spike in the head-movement data as a non-UI-targeted head movement. Where there are differences between the head-movement data and the body-movement data, the wearable computer may identify corresponding head-movements as UI-targeted-head movements.

In addition, an example may involve the wearer operating the wearable computer while driving a car. However, instead of the remote sensor being located on the wearer, the sensor may be located proximate to the wearer, such as in the glove box of the car. Thus, head-movement data from the wearable computer may be compared with movement data from the sensor in the glove box to facilitate identifying UI-targeted head movements. Further, in some embodiments, a plurality of sensors may associated with the user and in objects proximate to the user for "skeletal tracking" to receive angles of body tilts, body motions, and body orientations, among other possibilities.

It should be understood that the examples herein are provided for illustration. There may be other body movements that may characterized as UI-targeted movements or non-UI-targeted movements that are not described above, without departing from the scope of the embodiments herein.

iii. Using Context Signals

As noted, block 104 of method 100 involves using one or more context signals to determine a first activity associated with the head-mountable display. In some embodiments, context signals may be obtained by sensors associated with the computing system and/or the head-mountable display.

By way of example and without limitation, the wearable computer and/or computing system may include any one or more of a climate sensor (e.g., digital thermometer, rain sensors, humidity detector, etc.), microphones (possibly for voice recognition), sound detection technology, forward-facing cameras (possibly for facial recognition and/or to receive information regarding the environment), motion sensors for gesture detection, ambient light sensors (perhaps to differentiate being indoors versus outdoors), and wireless localization (possibly for proximity detection), among many other possible sensors to receive context signals. Other context detection devices or elements may also be included within the wearable computer to receive context signals, such as the motion detectors (e.g., a gyroscope, an accelerometer, a gravimeter, a camera, and/or a shock sensor) described above. Further, other functions may be performed by these devices or elements to receive context signals, perhaps in combination with the other sensors. Exemplary embodiments of sensors that may be included in an example computing system are discussed further below with respect to FIGS. 5A and 9A.

Accordingly, the wearable computer may receive various context signals using one or more sensors associated with the wearable computer and/or computing system. A context signal may be any signal that provides a measurement of or otherwise provides information pertaining to the state or the environment associated with a certain subject (e.g., with a certain person, device, event, etc.). For example, the context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a wearable computer associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a wearable computer, (v) devices that are currently available to communicate with the wearable computer, (w) devices that have been detected by the wearable computer, (x) devices associated with the wearable computer (e.g., devices that are "trusted" by the wearable computer, devices associated with the user's account, etc.), (y) information derived from cross-referencing any two or more of: information on a user's calendar, information available via a user's social networking account, and/or other context signals or sources of context information, (z) health statistics or characterizations of a user's current health (e.g., whether a user has a fever, whether a user just woke up from being asleep, whether a user's blood sugar concentration is within a normal range, and/or whether a user's pacemaker receives data associated with an adequate heart rate), and (aa) a user's recent context as determined from sensors on or near the user and/or other sources of context information, (bb) a current location, (cc) a past location, and (dd) a future location.

Some context signals may take the form of discrete measurements. For example, a temperature measurement or a current GPS location may be used as a context signal. On the other hand, context signals may also be determined or measured over time, or may even be a continuous signal stream. For instance, an exemplary device may use the current volume of a continuous audio feed from an ambient microphone as one context signal, and the volume of a continuous audio feed from a directional microphone as another context signal. Further, context signals may provide for patterns of data, possibly identifying an activity. For instance, a swinging pattern may be recognized by one or more movement sensors in the wearable computer to identify that the wearer is swinging back and forth on a hammock.

In some embodiments, a "change in context" may be defined by changes between values of one or more context signals. Alternatively, a change in context may include deviations to a data-based description or modifications to the characterization of an environment or state that is determined or derived from one or more context signals. For example, a change in context may take the form of data indicating changes to the environment or state information such as moving from "home" to "at work," from "outside" to "in a car," from "outdoors" to "indoors," from "inside" to "outside," from "free" to "in a meeting," etc. In some instances, a change in context may indicate an action indicative of changes to the environment or state information such as "going to work," "getting in the car," "going inside," "going outside," "going to a meeting," etc. Furthermore, a change in context may be a qualitative or quantitative indication that is determined based on one or more context signals. For example, context signals indicating a change in time to 6:30 AM on a weekday and that a user is located at their home may be used to determine the change in context such that the user went from "sleeping" to "getting ready for work." In some instances, the change in context may be indicate a change to the environment or state information but may simply be reflected in a database as "going to work."

In some embodiments, context signals, such as those mentioned above, may determine an activity, perhaps a "first activity" that the wearer may be engaged in. In particular, context signals received by wearable computer may be indicative of a first activity. A first activity may correspond to the wear's movement after placing the wearable computer on the wearer's head. Further, the first activity may correspond to the wearer's activity after the wearable computer has woken up from sleep (e.g., after changing modes from sleep mode to another mode, etc.). Yet further, the first activity may be correspond to an activity after the wearer has interacted with the wearable computer to manually record the activity (e.g., by pushing a button on the wearable computer, tapping the touch pad mounted on the wearable computer, etc.). However, in some instances, the first activity may be recognized after a calibration process is performed by the wearer. Further, in some instances, a first activity may be the wearer's activity after the wearable computer authenticates the wearer. Other possibilities may also exist.

A second activity may generally be any activity other than the first activity of the wearer. Sensors in the wearable computer may be used to determine the difference between the first activity and the second activity by detecting context signals, perhaps as described above. Further, there may be other activities, such as a third activity, that the wearable computer may determine. In some instances, the third activity may be the same as the first activity. Other possibilities may also exist.

Further, in some embodiments, the wearer may simply provide an indication to the wearable computer and/or computing system that the wearer is involved in an activity and/or is about to engage in an activity. Upon providing such an indication, the wearable computer and/or computing system may then enter a specific mode of operation and/or initiate a head-movement interpretation scheme that corresponds to the activity indicated. For example, the wearer may be preparing to go on a run on a treadmill. Just prior to starting the run, the wearer may press a button on the side of the wearable computer indicating that the wearer is about to start running.

In some instances, the wearable computer may then enter a "running mode" (i.e. utilize a head-movement interpretation scheme) designed for using a user interface of the wearable computer such that the wearer may both run and operate the wearable computer. As noted, there may be a value for a sensitivity parameter used to adjust the sensitivity of the sensors. In this instance, upon initiating a running mode and/or the head-movement interpretation scheme for running, this value may be set to decrease the sensitivity level of the sensors while running (e.g., set to a level one on the example scale from one to ten).

Further, in some instances, a mode of operation employing a head-movement interpretation scheme may provide for different modalities to accommodate operating the wearable computer. For example, referring to the treadmill illustration above, running may create large amounts of vertical (e.g., up and down) head movements. In such instances, content may no longer be browsed and/or scrolled through using vertical head movements. Instead, scroll bars may be placed horizontally such that horizontal head movements must used to browse and/or scroll through content. Further, in some instances, upon initiating the run, vertical head-movements may be ignored such that only horizontal UI-targeted movements may be used to control content.

In some embodiments, the wearable computer and/or computing system may obtain data from one or more sensors to determine an activity. For example, an accelerometer, a gyroscope, and/or a gravimeter, may provide context signals indicative of the wearer's activity. In particular, an accelerometer may provide wearer-related translational data while a gyroscope may be used to obtain wearer-related rotational data. In such instances, such data may be used to determine an activity. Further, as noted, sensory configurations may be used remotely with the wearable computer to determine an activity. For example, referring to a previous scenario, a wearer driving a car while operating the wearable computer may also have a sensor in the car's glove compartment. Upon receiving head-movement data from the wearable computer and car-movement data from the sensor in the car, data comparisons may be made to determine that the car is moving.

Figure 3A:
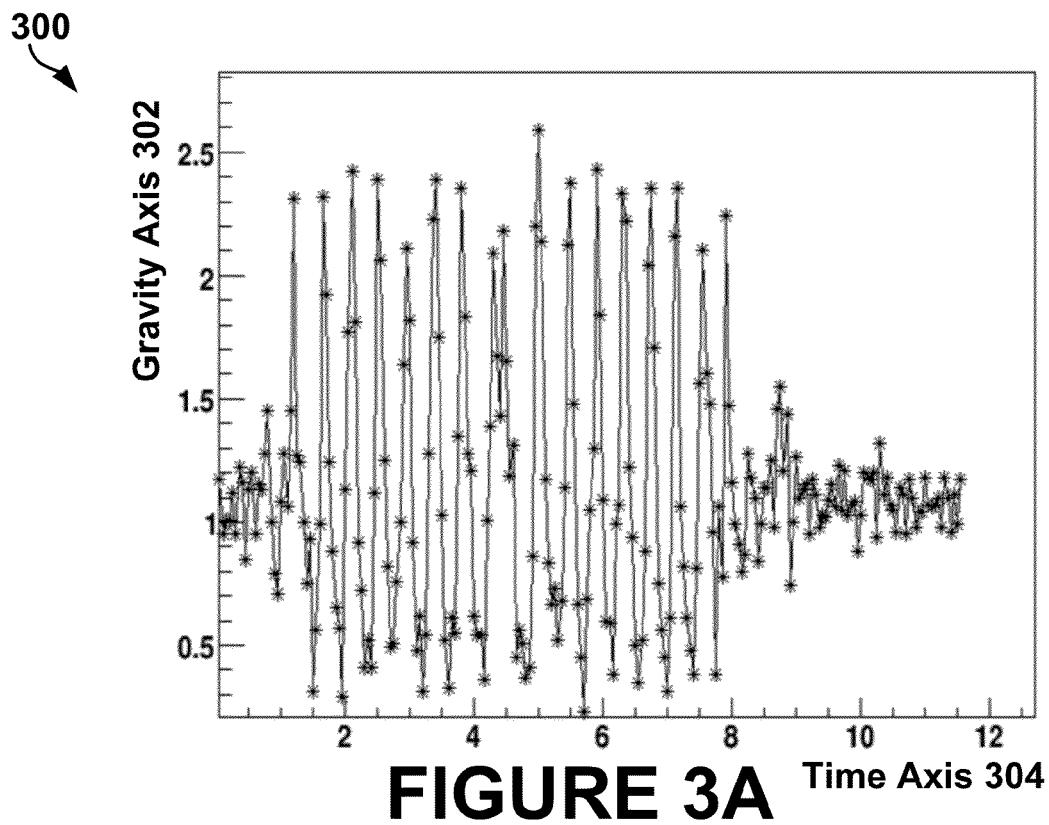
FIGS. 3A and 3B are diagrams illustrating accelerometer data, according to an exemplary embodiment.
Figure 3B:
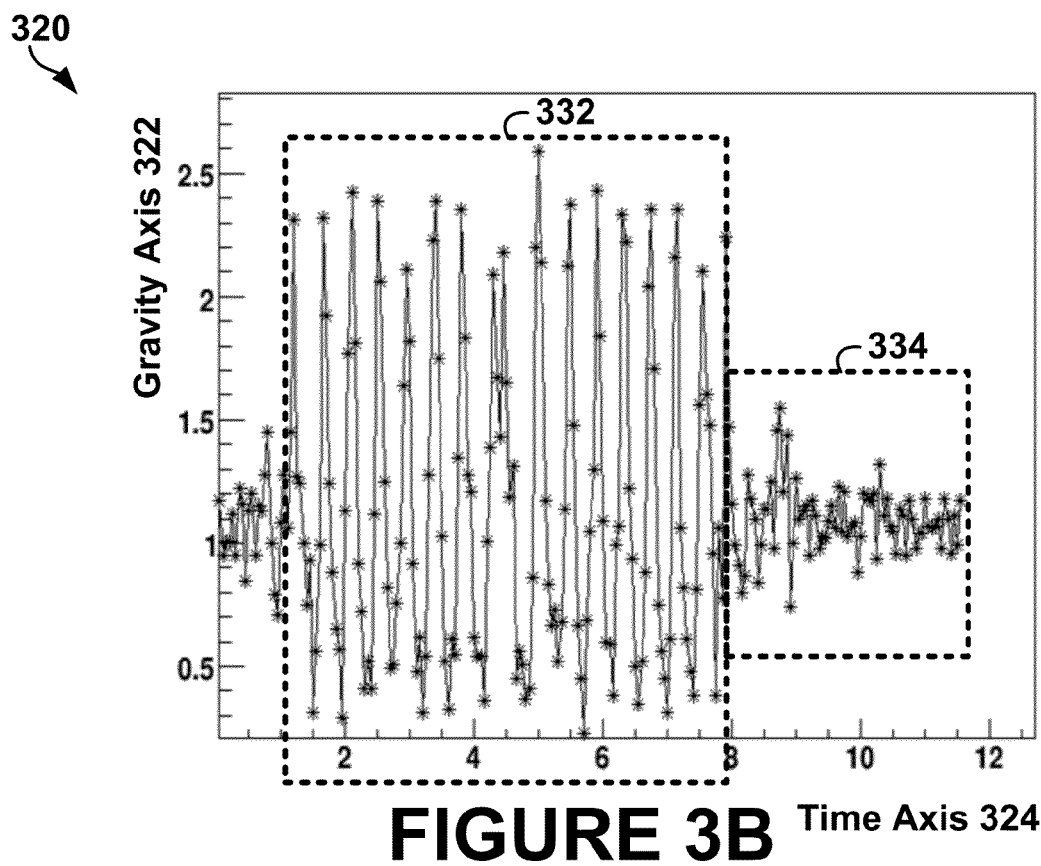

FIG. 3A is a diagram 300 illustrating movement data, according to an exemplary embodiment. In particular, diagram 300 may be an illustration of movement data corresponding to a sensor in the wearable computer. For example, the movement data may be obtained and/or provided from an accelerometer indicative of a wearer running to catch a bus while wearing the wearable computer. In particular, gravity axis 302 may represent the force of gravity (G) in standard gravity units, therefore centering much of the data around 1 G. Time axis 304 may represent time in seconds, showing approximately twelve seconds in FIG. 3A. FIG. 3A shows that for approximately the first two seconds, the wearer took a few steps. Then, the wearer may have recognized that their bus that just arrived at a nearby stop. From approximately 2-8 seconds, FIG. 3A shows large changes of gravity indicating the wearer may have been running to catch the bus. After about 8 seconds, the changes in gravity diminish, perhaps indicating the wearer caught their bus As illustrated, the wearer's acceleration upward along gravity axis 302 represents the beginning of each stride made by the wearer. In such instances, the accelerometer detects a force in the opposite direction towards the ground and provides data showing an increase in gravity (illustrated by points greater than 1 G). Oppositely, the acceleration downward on gravity axis 302 represents ending of each stride. In such instances, the accelerometer detects a force in the opposite direction towards the sky and provides data showing a decrease in gravity (illustrated by points less than 1 G). As such, the wearable computer may recognize a pattern in translational data from the accelerometer and determine that the wearer was running FIG. 3B is a diagram 320 illustrating movement data, according to an exemplary embodiment. Diagram 320 may be the same illustration of movement data as provided in FIG. 3A. Further, the movement data may also be obtained and/or output from an accelerometer indicative of a wearer running to catch a bus while wearing the wearable computer. Gravity axis 322 and time axis 324 may represent the same units as mentioned above for FIG. 3A. FIG. 3B shows recognized patterns in the accelerometer data. In particular, a wearable computer or computing system may identify portion 332 of diagram 320 as a running pattern, possibly due to pre-recorded accelerometer data saved while modeling the wearer's running patterns.

In addition, the wearable computer may determine that the wearer has entered the bus upon recognizing that the wearer has stopped running as shown in portion 334. Further, the wearable computer may use temperature sensors, noise sensors, and/or GPS technology, amongst other possible sensors to identify when the wearer enters the bus. The wearable computer may then possibly enter "bus travelling mode" and initiate a head-movement interpretation scheme for adjusting a value for sensitivity parameters (e.g., adjusting sensitivity to a moderate value while in bus travelling mode).

As indicated, the wearable computer may model typical movements of the wearer with various activities, such as a wearer's running pattern, for example. In some instances, the wearable computer may use an accelerometer to capture translational data and a gyroscope to obtain rotational data to intelligently model user activities. Further, in some instances, such data may be stored as context signals. Additionally, in some instances, such data may be stored in a context-signal-to-activity database such that such signals can be used to identify a corresponding activity. For example, one or more context signals may be used to create a search string. In some instances, the search string may pinpoint a unique activity. For instance, the wearable computer may recognize the wearer's running pattern, the time of day, and the wearer's schedule and/or the bus schedule, among other possibilities to determine that the wearer is running to catch a bus.

Further, the context-signal-to-activity database may be adaptive. The wearable computer may continuously receive and store context signals such that the system can learn when the wearer is engaged in an activity. For example, a wearer may manually indicate being involved in an activity based on certain context signals. After recording the context signals associated with manually indicating the activity, the wearable computer may begin receiving context signals and identifying the activity on its own.

In some embodiments, the wearable computer may initiate gesture recognition to determine a wearer's activities. In some instances, continuous and/or discrete gesture detection may be recognized to determine a user's activities. For example, the wearer may tap the side of the wearable computer (using discrete gesture detection) such that the wearable computer may enter a "cab riding mode" and initiate an appropriate head-movement interpretation scheme as the user gets into the cab. Yet, in some instance, the wearer may make a rotation gesture (as if they were dialing on a rotary phone) indicating to the wearable computer to call a cab service (i.e. continuous gesture detection).

Further, in some embodiments, the computer may recognize a plurality of activities that the wearer may be involved in. To illustrate, the wearable computer may receive data as shown in FIG. 3A, recognize a gesture for the wearer waving down a cab, and identify that the wearer is making a call. In such instances, the wearable computer may recognize that the wearer has missed the bus and is now waving to catch a cab while talking on the phone. Further, in such instances, the wearable computer may wait to receive more context signals for identifying the wearer's activity before initiating a head-movement interpretation scheme. Yet, in some instances, the wearable computer may initiate a standard head-movement interpretation scheme or not initiate any scheme at all.

It should be understood that the above examples are provided for illustration. There may be other examples of context signals and/or activities that are not described above, without departing from the scope of the embodiments herein.

iv. Determining a Head-Movement Interpretation Scheme

Block 106 of method 100, shown in FIG. 1, involves determining a head-movement interpretation scheme corresponding to the first activity. In addition, block 108 of method 100 involves applying the determined head-movement interpretation scheme to determine input data corresponding to the received head-movement data.

In some embodiments, a head-movement interpretation scheme may be determined based on one or more activities identified. In some instances, one or more identified activities may be mapped to a head-movement interpretation scheme, which may use an activity-to-interpretation-scheme database. In some instances, the activity-to-interpretation-scheme database may be incorporated with the aforementioned context-to-activity database. For example, one or more activities may be used to create a search string. In some instances, searching based on the search string may result in a unique head-movement interpretation scheme. In one example, the wearable computer and/or computing system may recognize two activities such that the wearer is running and talking on the phone at the same time. In such instances, the wearable computer and/or computing system may implement an appropriate head-movement interpretation scheme associated with both activities. As such, the wearable computer and/or computing system may implement the scheme with the lower level of sensitivity and thus initiate the scheme associated with running.

Further, the activity-to-interpretation-scheme database may be adaptive. The wearable computer may continuously receive and store information such that the system can learn when to initiate a head-movement interpretation scheme. For example, a wearer may manually initiate a head-movement interpretation scheme based on certain activities. After recording the activities associated with manually changing the interpretation scheme, the wearable computer may begin identifying such activities and initiating the scheme on its own.

In addition, in some embodiments, a head-movement interpretation scheme may be determined from head-movement data received from one or more sensors associated with the wearable computer and/or computing system. As illustrated in FIGS. 3A and 3B, an exemplary embodiment may receive movement data (e.g., translational movement data) from an accelerometer to identify an activity which may determine a head-movement interpretation scheme.

In some embodiments, movement data may be received by a plurality of sensors. FIG. 4A is a diagram 400 illustrating movement data, according to an exemplary embodiment. In some instances, FIG. 4A may be representative of head-movement data in a three dimensional space (x, y, z) provided by a gyroscope in the wearable computer. Magnitude axis 402 may represent a magnitude of the head movement (e.g., an amount of velocity, angular velocity, and acceleration, among other possibilities) corresponding to the x, y, or z direction. In addition, time axis 410 may represent time, perhaps in seconds, and may possibly indicate the same approximate twelve-second time interval as provided in FIGS. 3A and 3B. In some instances, movement data 404 may be movement data obtained along the x-axis, movement data 406 may be movement data obtained along the y-axis, and movement data 408 may be movement data along the z-axis.

In one example provided in FIG. 4A, a head-movement interpretation scheme may be determined for movement data 404, 406, and 408 along all axes and for the duration shown by time axis 410. Yet, in some instances, a head-movement interpretation scheme may be determined for movement data along a specific axis, such as movement data 404 along the x-axis. Yet further, a head-movement interpretation scheme may be determined for movement data along two axes, such as movement data 406 along the x-axis and movement data 408 along the y-axis. Other combinations and possibilities may also exist.

In some embodiments, a head-interpretation scheme may be determined for movement data in accordance with time.

FIG. 4B is a diagram 420 illustrating movement data, according to an exemplary embodiment. FIG. 4B may be the same or similar representation of head-movement data provided in FIG. 4A so as to provide the data using a three dimensional space (x, y, z). Magnitude axis 422 may represent a magnitude of the head movement (e.g., velocity, angular velocity, and acceleration, among other possibilities) in the x, y, or z direction. In addition, time axis 410 may provide for time, perhaps in seconds, and may possibly indicate the same approximate twelve-second time interval in FIG. 4A. As illustrated, movement data 424 may be movement data obtained along the x-axis, movement data 426 may be movement data obtained along the y-axis, and movement data 428 may be movement data along the z-axis.

In some embodiments, a head-movement interpretation scheme may be initiated based on an activity. For example, portion 432 of FIG. 4B may correspond to the same or approximately the same time interval as portion 332 in FIG. 3B. In addition, portion 434 may correspond to the same or approximately the same time interval as portion 334 in FIG. 3B. As illustrated for FIG. 3B, the wearable computer may determine that the wearer is running during the time interval in portion 326. As such, a head-movement interpretation scheme appropriate for running may be determined for head-movement data corresponding to portion 432 of FIG. 4B. Yet further, in portion 434 of FIG. 4B, the wearable computer may recognize that the wearer is on the bus and may determine another (probably different) head-movement interpretation scheme appropriate for operating the wearable computer while on the bus.

In some embodiments, a head-movement interpretation scheme may be determined for head-movement data within a range. FIG. 4C is a diagram 440 illustrating movement data, according to an exemplary embodiment. FIG. 4C may be the same or similar representation of head-movement data provided in FIGS. 4A and 4B so as to provide the data using a three dimensional space (x, y, z). Magnitude axis 442 may represent a magnitude of head movement (e.g., velocity, angular velocity, and acceleration, among other possibilities) in the x, y, or z direction. In addition, time axis 450 may provide for time, perhaps in seconds, and may possibly indicate the same approximate twelve-second time interval in FIGS. 4A and 4B. As illustrated, movement data 444 may be movement data obtained along the x-axis, movement data 446 may be movement data obtained along the y-axis, and movement data 448 may be movement data along the z-axis.

Further, in some embodiments, a head-movement interpretation scheme may be determined for data identified by one or more ranges. For example, in FIG. 4C, range 452 and range 454 may be set such that a first head-movement interpretation scheme is only applied to the data in between range 452 and 454, excluding portions 456, 458, and 460. Further, in some instances, a second (possibly different) head-movement interpretation scheme may be applied to data outside and/or above range 452, perhaps corresponding to portions 456 and 460. In addition, a third head-movement interpretation scheme (possibly different than the first and second head-movement interpretation schemes) may be applied to data outside and/or below range 454, perhaps corresponding to portion 458. Yet, in some instances, no head-movement interpretation schemes may be applied at all for data identified by a particular range.

In some embodiments, a head-movement interpretation scheme may be determined for movement data within a data range and also in accordance with time. FIG. 4D is a diagram 480 illustrating movement data, according to an exemplary embodiment. FIG. 4D may be the same or similar representation of head-movement data provided in FIGS. 4A, 4B, and 4C so as to provide the data using a three dimensional space (x, y, z). Magnitude axis 482 may represent a magnitude of the head movement (e.g., velocity, angular velocity, and acceleration, among other possibilities) in the x, y, or z direction. In addition, time axis 490 may provide for time, perhaps in seconds, and may possibly indicate the same approximate twelve-second time interval in FIGS. 4A, 4B, and 4C. As illustrated, movement data 484 may be movement data obtained along the x-axis, movement data 486 may be movement data obtained along the y-axis, and movement data 488 may be movement data along the z-axis.

In some embodiments, a head-movement interpretation scheme may be determined for specific portions of data. For example, portion 492 of FIG. 4D may correspond to the same or approximately the same time interval as portion 332 in FIG. 3B. In addition, portion 494 may correspond to the same or approximately the same time interval as portion 334 in FIG. 3B. As noted for FIG. 3B, the wearable computer may determine that the wearer is running during the time interval in portion 332. Therefore, a first head-movement interpretation scheme may be applied to portion 492 of FIG. 4D, but may exclude portion 496 possibly as data corresponding to non-UI-targeted movements. Yet, in portion 494, the wearable computer may recognize that the wearer is on the bus and may determine a second (probably different) head-movement interpretation scheme, excluding portion 498 possibly as data corresponding to non-UI-targeted movements. In some instances, data in portions 496 and 498 may be non-UI-targeted data used to further identify a current activity.

It should be understood that the above examples are provided for illustration. There may be other examples determining head-movement interpretation schemes not described above, without departing from the scope of the embodiments herein.

v. Determining UI-Targeted Head Movements

As noted, a head-movement interpretation scheme may adjust to the specific activity that the wearer may be engaged in. Further, the head-movement interpretation scheme may be associated with sensitivity parameters of sensors used to distinguish between UI-targeted head movements and non-UI-targeted head movements. Referring back to a previous example, the head-movement interpretation scheme may control one or more values representative of sensitivity parameters. In practice, a value indicative of high sensitivity (possibly a level ten in an exemplary scale from one to ten) may be used in activities where there are little to no non-UI-targeted movements, possibly in instances where mostly all the movements are UI-targeted movements. Alternatively or in opposite, a value indicative of low sensitivity (perhaps a level one out of ten) may require head movements to be more recognizable and/or perhaps more exaggerated to be identified as UI-targeted movements. In some instances, such values for low sensitivity may require a slower head movement over a longer duration of time to be identified as a UI-targeted head movement.

For example, referring to FIG. 2A, wearable computer 200 may receive movement data associated with vertical movement 222 of head 202 to be recognized as a UI-targeted head movement. Given a value for high sensitivity, a partial rotation may responsively cause pointer 210 to move on a vertical path 208 along the Y-axis shown in graphic display 212. However, given a value for low sensitivity (possibly due to a particular head-movement interpretation scheme) movement 222 may correspond to a full rotation of head 202 and/or a relatively slow movement of head 222 to move pointer 210 vertically. Other possibilities may also exist.

In some embodiments, the head-movement interpretation scheme may determine the amount of virtual movement on a graphic display. Further, in some embodiments, a parameter controlling the counts per inch (CPI) of head movements may be determined. A CPI parameter may determine the number of increments, distances, and/or degrees (e.g., angular measurements, azimuth, and altitude, among other possibilities), which may be referred to as "counts" that a head must move for the pointer to move one inch on the graphic display. In some instances, a count may be a degree of movement in a three-dimensional space possibly measured by as azimuth or altitude in a horizontal coordinate system, among other possibilities. In some instances, the head-movement interpretation scheme may determine a value for the CPI parameter, perhaps by inversely relating the sensitivity and CPI parameters. For example, given a value for lowering sensitivity, the CPI parameter may be increased so as to lower the amount of pointer movement mapped to a given amount of head movement. Oppositely, given a value for increasing sensitivity, the CPI parameter may be decreased to create a more pointer movement mapped to a given amount of body movement.

In some embodiments, UI-targeted movements may be distinguished from non-UI-targeted movements. In addition, the non-UI-targeted data distinguished may further be used to determine an activity. For example, referring to FIG. 4B, portion 432 may be data associated with non-UI-targeted head movements, possibly due to the wearer running during this time. Further, portion 434 may be data associated with UI-targeted head movements, perhaps from the wearer making head movements to control content on the wearable computer. In FIG. 4C, the head-movement data between range 452 and 454 may be data associated with UI-targeted head movements. Further, other data outside of range 452 and 454 such as portions 456, 458, and 460 may correspond to non-UI-targeted head movements. In addition, in FIG. 4D, head-movement data in portion 472 may be associated with non-UI-targeted movements whereas head-movement data in portion 494 may be associated with UI-targeted movements, however, data in portions 496 and 498 may correspond to non-UI-targeted head movements.

In some embodiments, UI-targeted movement data may be compared with non-UI-targeted movement data. Further, in some instances, data initially characterized as non-UI-targeted data may be analyzed and associated with UI-targeted movement data. For example, as indicated in FIG. 4C, portions 456, 458, and 460 may initially be characterized as non-UI-targeted movement data, possibly according to a head-movement interpretation scheme. In some instances, areas may be defined by borders of portions 456, 458, and 460 and a sum of these areas may be obtained representative of non-UI-targeted movements. Further, in some instances, a sum of areas under movement data and within the borders of portions 456, 458, and 460 may be obtained representative of non-UI-targeted movements. In addition, the sum of areas under movement data may be obtained for UI-targeted movement data as defined between range 452 and 454. Therefore, a sum of areas representative of non-UI-targeted movement data may be compared with a sum of areas corresponding to UI-targeted movement data, perhaps indicating a larger sum of non-UI-targeted movement data. In such instances, areas corresponding to non-UI-targeted movement data may be converted and associated with UI-targeted movement data. In some instances, a different head-movement interpretation scheme may be determined, possibly as illustrated in FIG. 4D. Other possibilities may also exist.

Further, in some embodiments, one or more filters may be applied to head-movement data. Additionally, in some instances, a filter may be used to determine UI-targeted head movements. Referring back to FIG. 4A-D, in some instances, a filter scheme (band-pass filters, low-pass filters, and high-pass filters, among other possible filters) may be applied to determine UI-targeted head movements. In some instances, a filter may be applied to distinguish UI-targeted head movement data from non-UI-targeted head movement data. For example, one or more filters may be applied to movement data in FIG. 4C to associate movement data in portions 456, 458, and 460 with non-UI-targeted movement data. Further, in some instances, filter may be applied to UI-targeted movement data that may already be identified as UI-targeted movement data. Other possibilities may also exist.

In some embodiments, a head-movement interpretation scheme may provide a first value to map a given amount of head-movement data to UI-targeted head movements. However, upon recognizing an activity, the first value may be adjusted to a different value (perhaps a second value), causing the mapping between the head-movement to UI-targeted data to be modified. In such instances, the modified mapping may determine the head-movement interpretation scheme. For example, considering FIG. 2A, the wearer may be walking to their office and a first value may set the CPI parameter to a level five to move pointer 210 (e.g., five counts per inch) on graphic display 212. Upon recognizing that the wearer has entered the office and has sat down at their desk, the first value of level five may be adjusted to a level one to increase sensitivity to head movements and move pointer 210 based on the CPI parameter of one count per inch. In some instances, this CPI parameter may facilitate determining a head-movement interpretation scheme associated with an office environment.

Further, in some embodiments, a head-movement interpretation scheme may provide a first value to map a given amount of head-movement data to non-UI-targeted head movements. Yet, upon recognizing an activity, the first value may be adjusted to a different value (perhaps a third value), causing the mapping between the head-movement data to non-UI-targeted data to be modified. In such instances, the modified mapping may provide for non-UI-targeted data that may be used as context signals to determine further activities of the wearer such as a second activity. Considering the example above, the wearer may be walking to their office and a first value may set the CPI parameter to a level five to move pointer 210 (e.g., five counts per inch) on graphic display 212. Upon recognizing that the wearer has entered the office and has sat down at their desk, the first value of level five may be adjusted to a level one to increase sensitivity to head movements and move pointer 210 based on the CPI parameter of one count per inch. In some instances, this CPI parameter may map further head-movement data to non-UI-targeted movements to determine a second activity, perhaps when the wearer starts talking and a head-movement interpretation scheme associated with talking is initiated.

It should be understood that the above examples are provided for illustration. There may be other examples of determining UI-Targeted Head Movements that are not described above, without departing from the scope of the embodiments herein.

Referring back to FIG. 1, block 110 of method 100 involves providing the determined input data for at least one function of the head-mountable display. In some embodiments, the input data may provide an instruction, such as a UI command, to carry out a function of the head-mountable display. For example, input data may specify an amount of virtual movement to be shown on content provided in a graphic display.

In addition, in some embodiments, the wearable computer may recognize UI-targeted head movements that correspond to the amount of virtual movement and provide instructions accordingly. Further, in some instances, the amount of virtual movement may be visually represented on a graphic display, such as graphic display 212 in FIGS. 2A-D. Further, in some embodiments, the amount of virtual movement may correspond to the movement of a pointer, such as pointer 210. In some instances, the virtual movement may be with respect to a graphic object, such as graphic object 214. Further, in some instances, the virtual movement may include panning, browsing, paginating, and/or scrolling content in the graphic display, among other possibilities.

It should be understood that the above examples are provided for illustration. There may be other examples of providing input data that are not described above, without departing from the scope of the embodiments herein.

C. Example System and Device Architecture

Figure 5A:
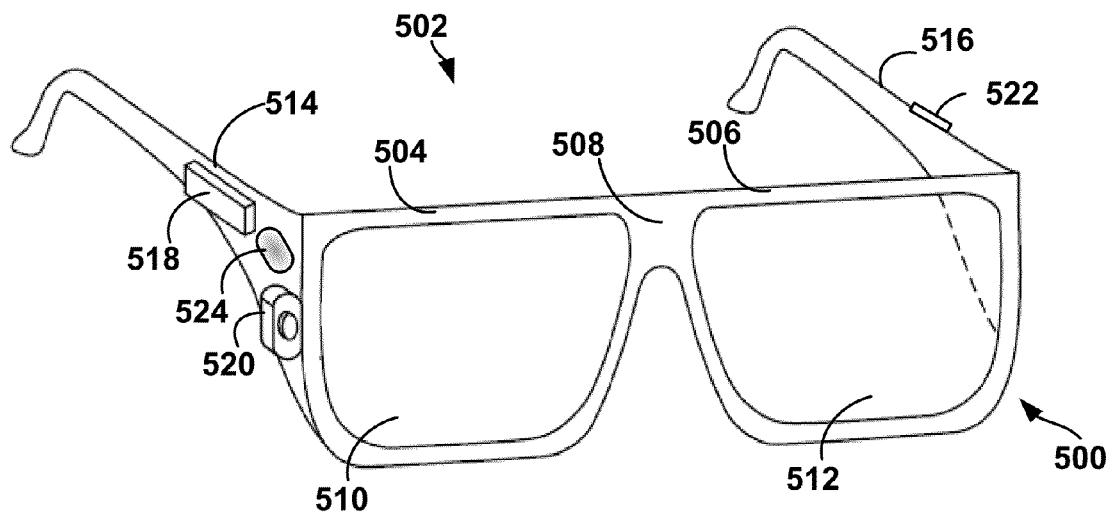
FIG. 5A is a diagram illustrating a first example system for receiving, transmitting, and displaying data, according to an exemplary embodiment.

FIG. 5A is a diagram illustrating a first example system for receiving, transmitting, and displaying data, according to an exemplary embodiment. The system 500 is shown in the form of a wearable computing device. While FIG. 5A illustrates a head-mounted device 502 as an example of a wearable computing system, other types of wearable computing devices could additionally or alternatively be used. As illustrated in FIG. 5A, the head-mounted device 502 has frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements 510, 512.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be connected by wires or wirelessly connected to the head-mounted device 502). The on-board computing system 518 may include a processor and memory, for example. The on-board computing system 518 may be configured to receive and analyze data from the video camera 520, the sensor 522, and the finger-operable touch pad 524 (and possibly from other sensory devices, user-interfaces, or both) and generate images for output by the lens elements 510 and 512. The on-board computing system 518 may additionally include a speaker or a microphone for user input (not shown). An example computing system is further described below in connection with FIG. 8.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Video cameras with a small form-factor, such as those used in cell phones or webcams, for example, may be incorporated into an example embodiment of the system 500.

Further, although FIG. 5A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

Figure 5B:
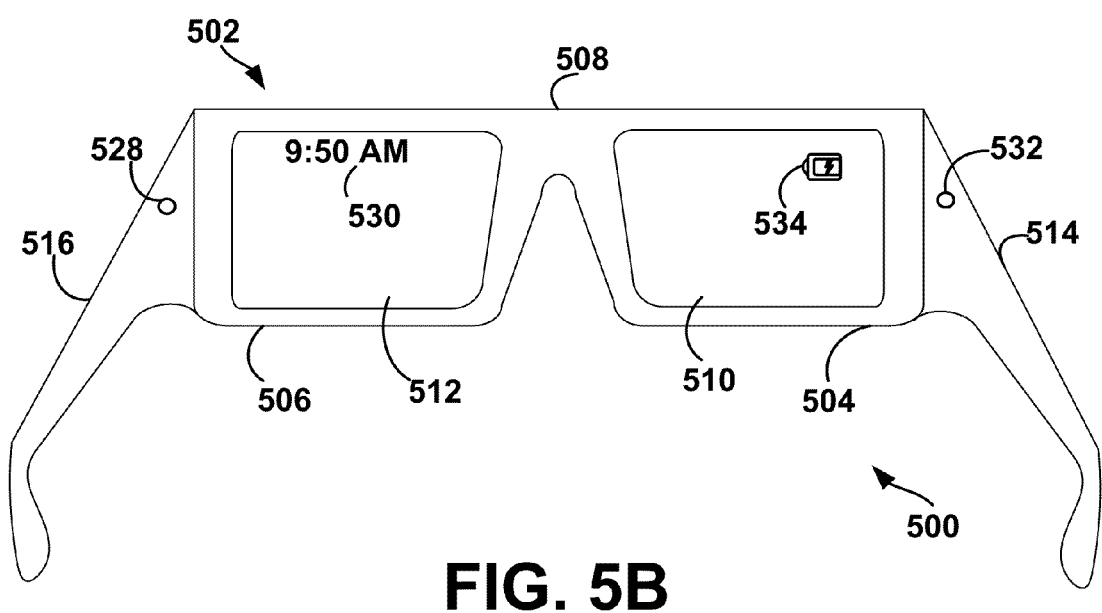
FIG. 5B is a diagram illustrating an alternate view of the system illustrated in FIG. 5A, according to an exemplary embodiment.

FIG. 5B is a diagram illustrating an alternate view of the system illustrated in FIG. 5A, according to an exemplary embodiment. As shown in FIG. 5B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may be omitted (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or light emitting diode (LED) source and scanning system could be used to draw a raster display directly onto the retina of one or more of the user's eyes. Other possibilities exist as well.

FIG. 6A is a diagram illustrating a second example system for receiving, transmitting, and displaying data, according to an exemplary embodiment. The system 600 is shown in the form of a wearable computing device 602. The wearable computing device 602 may include frame elements and side-arms such as those described with respect to FIGS. 5A and 5B. The wearable computing device 602 may additionally include an on-board computing system 604 and a video camera 606, such as those described with respect to FIGS. 5A and 5B. The video camera 606 is shown mounted on a frame of the wearable computing device 602; however, the video camera 606 may be mounted at other positions as well.

As shown in FIG. 6A, the wearable computing device 602 may include a single display 608 which may be coupled to the device. The display 608 may be formed on one of the lens elements of the wearable computing device 602, such as a lens element described with respect to FIGS. 5A and 5B, and may be configured to overlay computer-generated graphics in the user's view of the physical world. The display 608 is shown to be provided in a center of a lens of the wearable computing device 602; however, the display 608 may be provided in other positions. The display 608 is controllable via the computing system 604 that is coupled to the display 608 via an optical waveguide 610.

FIG. 6B is a diagram illustrating a third example system for receiving, transmitting, and displaying data, according to an exemplary embodiment. The system 620 is shown in the form of a wearable computing device 622. The wearable computing device 622 may include side-arms 623, a center frame support 624, and a bridge portion with nosepiece 625. In the example shown in FIG. 6B, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 5A and 5B.

The wearable computing device 622 may include a single lens element 630 that may be coupled to one of the side-arms 623 or the center frame support 624. The lens element 630 may include a display such as the display described with reference to FIGS. 5A and 5B, and may be configured to overlay computer-generated graphics upon the user's view of the physical world. In one example, the single lens element 630 may be coupled to a side of the extending side-arm 623. The single lens element 630 may be positioned in front of or proximate to a user's eye when the wearable computing device 622 is worn by a user. For example, the single lens element 630 may be positioned below the center frame support 624, as shown in FIG. 6B.

FIG. 7 is a simplified block diagram illustrating an example computer network infrastructure, according to an exemplary embodiment. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted device 502, 600, or 620 described with reference to FIGS. 5A-6B.

Thus, the device 710 may include a display system 712 comprising a processor 714 and a display 716. The display 716 may be, for example, an optical see-through display, an optical see-around display, or a video see-through display. The processor 714 may receive data from the remote device 730, and configure the data for display on the display 716. The processor 714 may be any type of processor, such as a microprocessor or a digital signal processor, for example.

The device 710 may further include on-board data storage, such as memory 718 coupled to the processor 714. The memory 718 may store software that can be accessed and executed by the processor 714, for example.

The remote device 730 may be any type of computing system or transmitter including a laptop computer, a mobile telephone, or tablet computing system, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus, among other connections. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee, among other possibilities. Either of such a wired and/or wireless connection may be a proprietary connection as well. The remote device 730 may be accessible via the Internet and may include a computing cluster associated with a particular web service (e.g., social-networking, photo sharing, address book, etc.).

Figure 8:
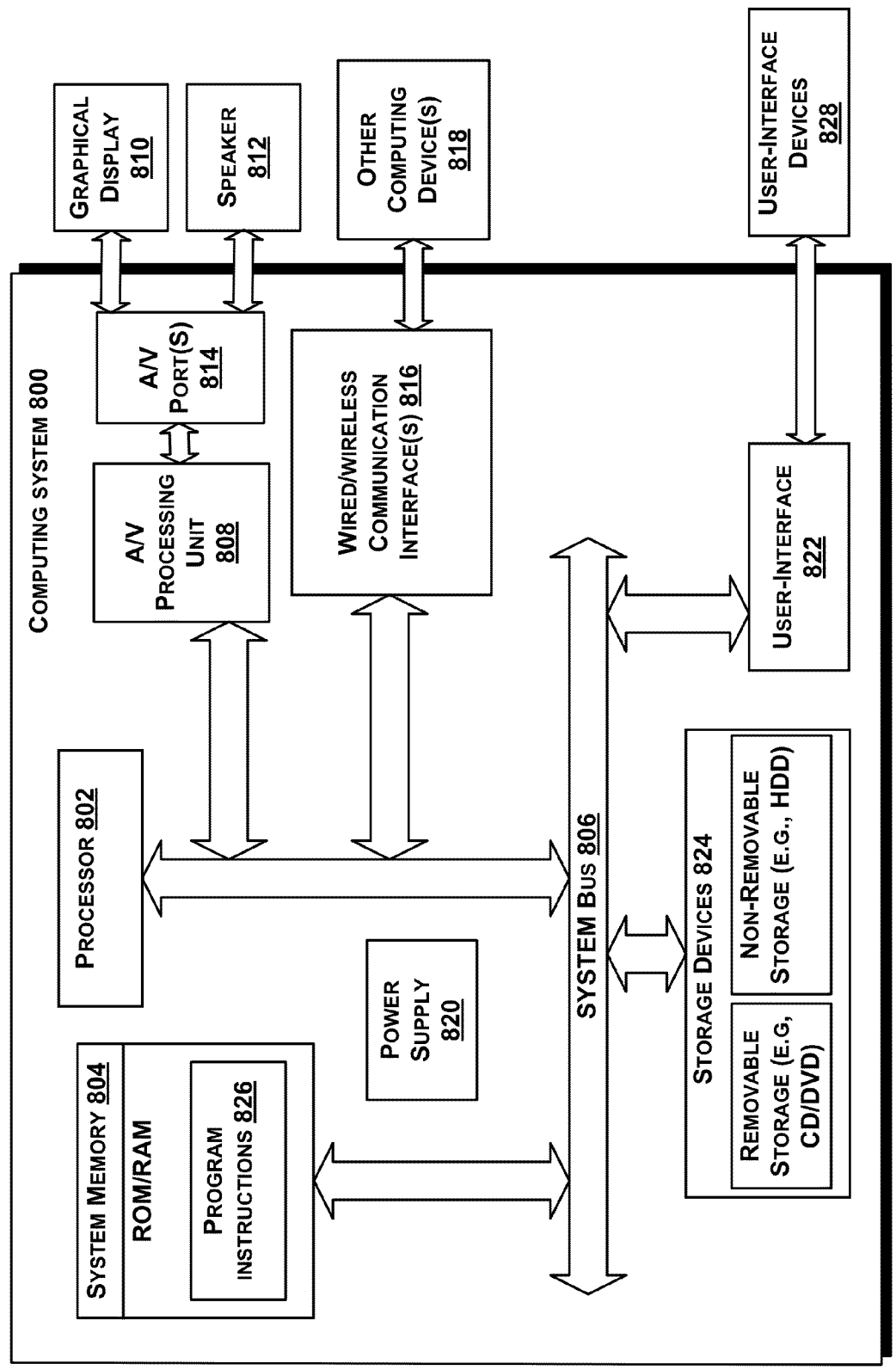
FIG. 8 is a simplified block diagram illustrating example components of an example computing system, according to an exemplary embodiment.

As described above in connection with FIGS. 5A-6B, an example wearable computing system may include, or may otherwise be communicatively coupled to, a computing system, such as computing system 518 or computing system 604. FIG. 8 is a simplified block diagram illustrating example components of an example computing system, according to an exemplary embodiment. One or both of the device 710 and the remote device 730 may take the form of computing system 800.

Computing system 800 may include at least one processor 802 and system memory 804. In an example embodiment, computing system 800 may include a system bus 806 that communicatively connects processor 802 and system memory 804, as well as other components of computing system 800. Depending on the desired configuration, processor 802 can be any type of processor including, but not limited to, a microprocessor (μP), a microcontroller (μC), a digital signal processor (DSP), or any combination thereof. Furthermore, system memory 804 can be of any type of memory now known or later developed including but not limited to volatile memory (such as RAM), non-volatile memory (such as ROM, flash memory, etc.) or any combination thereof.

An example computing system 800 may include various other components as well. For example, computing system 800 includes an A/V processing unit 808 for controlling graphical display 810 and speaker 812 (via A/V port 814), one or more communication interfaces 816 for connecting to other computing systems 818, and a power supply 820. Graphical display 810 may be arranged to provide a visual depiction of various input regions provided by user-interface module 822. For example, user-interface module 822 may be configured to provide a user-interface, such as the example user-interface described below in connection with other FIGS. 9A-D below and graphical display 810 may be configured to provide a visual depiction of the user-interface.

Figure 9A:
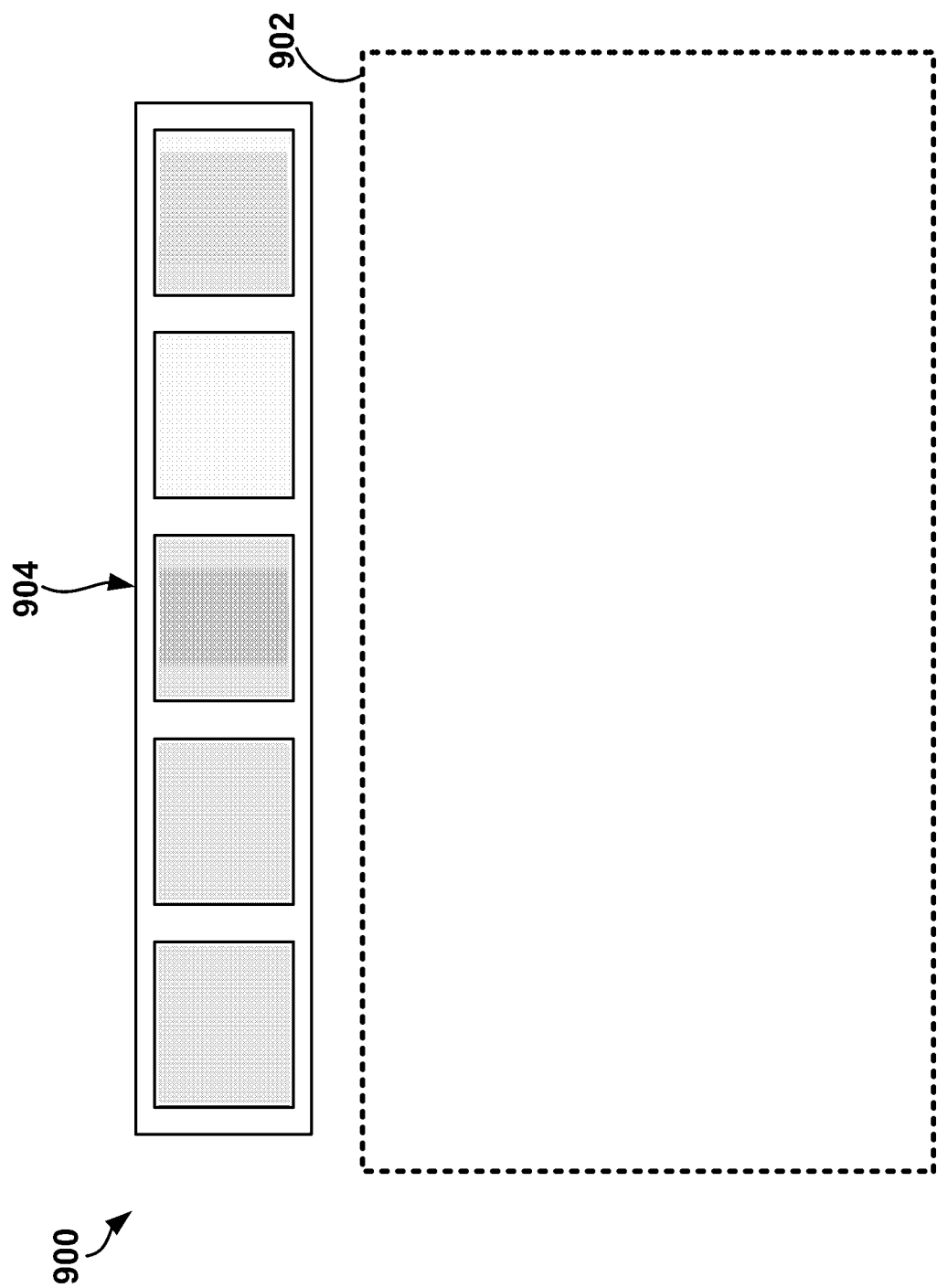
FIG. 9A is a diagram illustrating aspects of an example user-interface, according to an exemplary embodiment.
Figure 9B:
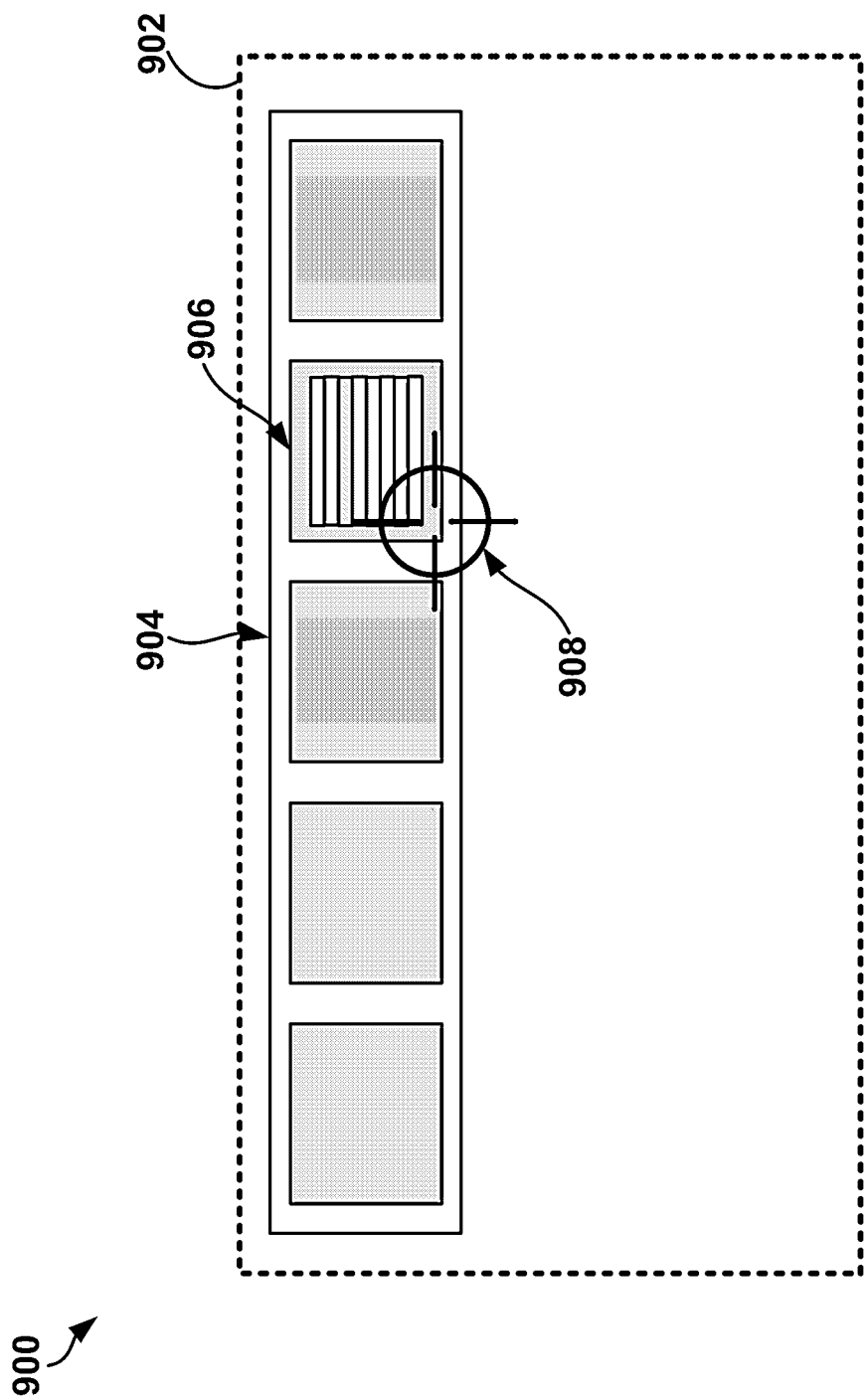
FIG. 9B is a diagram illustrating aspects of an example user-interface after receiving movement data corresponding to an upward movement, according to an exemplary embodiment.
Figure 9C:
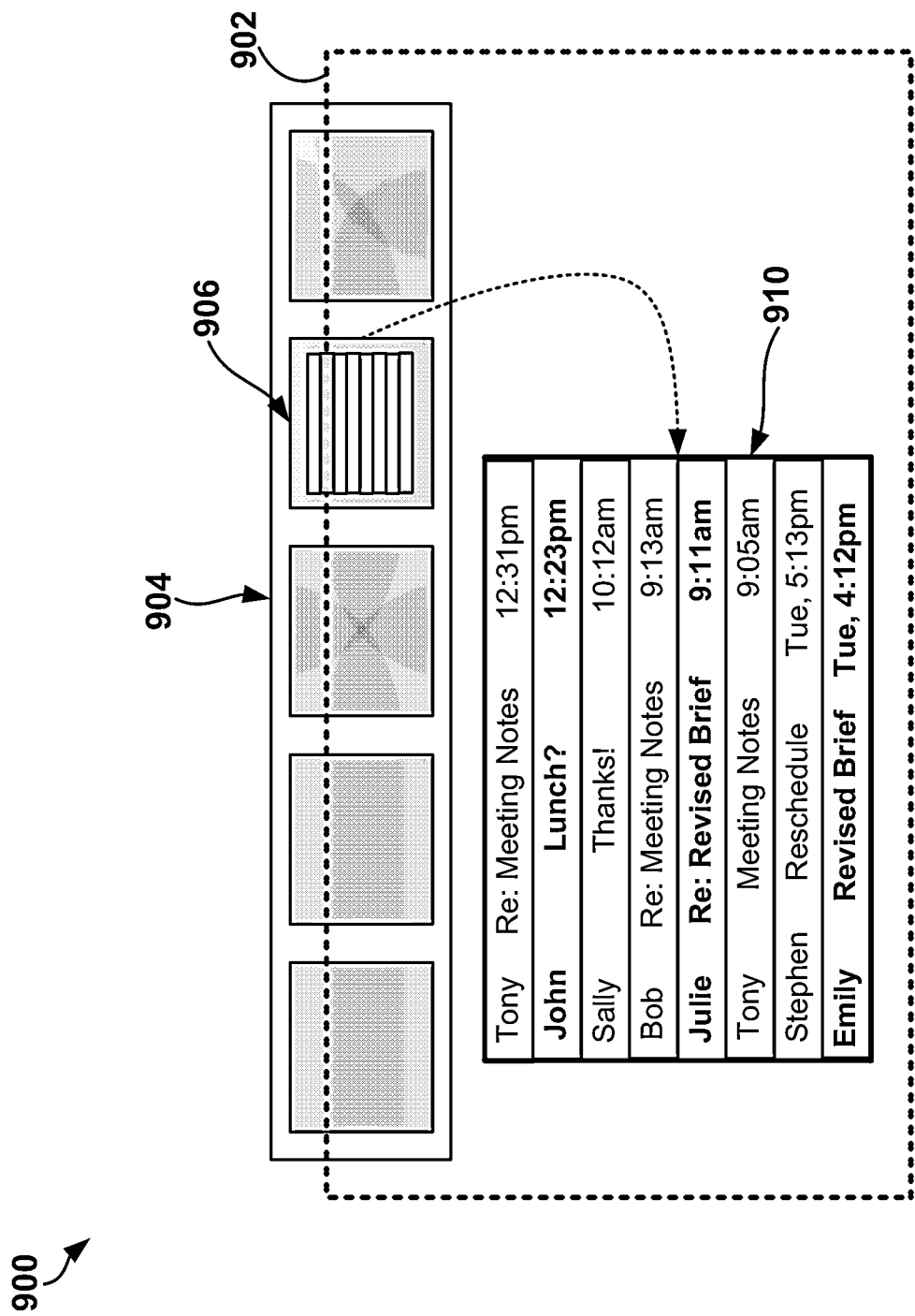
FIG. 9C is a diagram illustrating aspects of an example user-interface after selection of a selected content object, according to an exemplary embodiment.
Figure 9D:
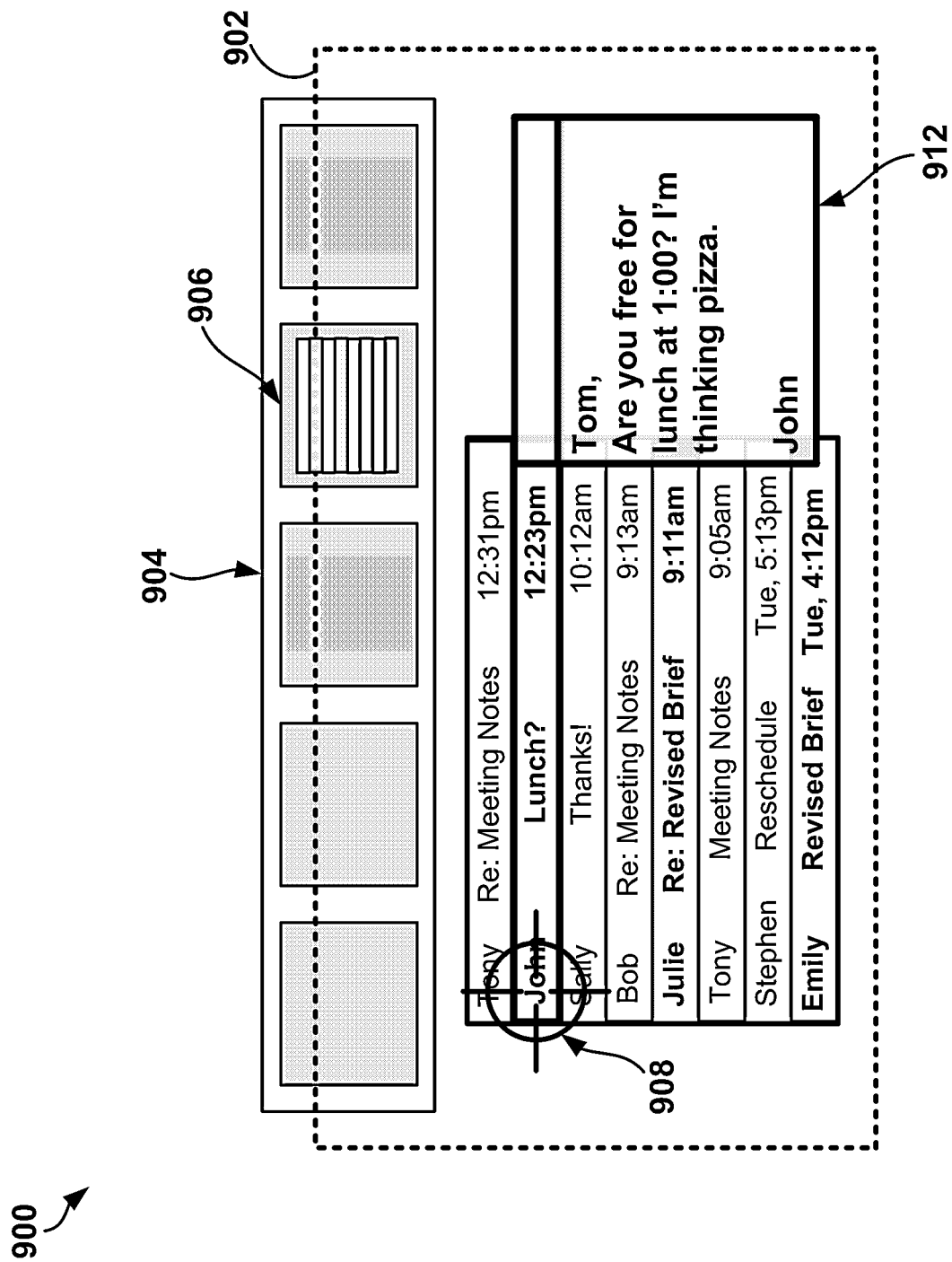
FIG. 9D is a diagram illustrating aspects of an example user-interface after receiving input data corresponding to a user input, according to an exemplary embodiment.

FIG. 9A is a diagram illustrating aspects of an example user-interface, according to an exemplary embodiment. FIG. 9B is a diagram illustrating aspects of an example user-interface after receiving movement data corresponding to an upward movement, according to an exemplary embodiment. FIG. 9C is a diagram illustrating aspects of an example user-interface after selection of a selected content object, according to an exemplary embodiment. FIG. 9D is a diagram illustrating aspects of an example user-interface after receiving input data corresponding to a user input, according to an exemplary embodiment.

User-interface module 822 may be further configured to receive data from and transmit data to (or be otherwise compatible with) one or more user-interface devices 828.

Furthermore, computing system 800 may also include one or more data storage devices 824, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 800.

According to an example embodiment, computing system 800 may include program instructions 826 that are stored in system memory 804 (and/or possibly in another data-storage medium) and executable by processor 802 to facilitate the various functions described herein including, but not limited to, those functions described with respect to method 100. Although various components of computing system 800 are shown as distributed components, it should be understood that any of such components may be physically integrated and/or distributed according to the desired configuration of the computing system.

E. Example User-Interface

FIGS. 9A-D show aspects of an example user-interface 900. The user-interface 900 may be displayed by, for example, a wearable computing device as described above for FIGS. 5A-6B and/or a computing system.

An example state of the user-interface 900 is shown in FIG. 9A, when the wearable computing device is in a first position. In some embodiments, the first position of the wearable computing device may correspond to a position of the wearable computing device when a wearer of the wearable computing device is looking in a direction that is generally parallel to the ground (e.g., not looking up or down). Other examples are possible as well.

As shown, the user-interface 900 includes a view region 902. An example boundary of the view region 902 is shown by a dotted frame. FIG. 9A shows view region 902 with a landscape orientation in which the view region 902 is wider than it is tall. In other embodiments the view region 902 may have a portrait orientation, in which view region 902 is taller than wide. View region 902 may have a rectangular shape, as shown in FIG. 9A, a square shape, or another shape, such as a circular or elliptical shape.

The view region 902 may be, for example, the viewable area between (or encompassing) the upper, lower, left, and right boundaries of a display on the wearable computing device. As shown, when the wearable computing device is in the first position, the view region 902 is substantially empty (e.g., completely empty) of user-interface elements, such that the user's view of their real-world environment is generally uncluttered, and objects in the user's environment are not obscured.

In some embodiments, the view region 902 may correspond to a field of view of a wearer of the wearable computing device, and an area outside the view region 902 may correspond to an area outside the field of view of the wearer. In other embodiments, the view region 902 may correspond to a non-diagonal portion of a field of view of a wearer of the wearable computing device, and an area outside the view region 902 may correspond to a diagonal portion of the field of view of the wearer. In still other embodiments, the user-interface 900 may be larger than or substantially the same as a field of view of a wearer of the wearable computing device, and the field of view of the wearer may be larger than or substantially the same size as the view region 902. The view region 902 may take other forms as well.

Accordingly, the portions of the user-interface 900 outside of the view region 902 may be outside of or in a diagonal portion of a field of view of a wearer of the wearable computing device. For example, as shown, a menu 904 may be outside of or in a diagonal portion of the field of view of the user in the user-interface 900. While the menu 904 is shown to be not visible in the view region 902, in some embodiments the menu 904 may be partially visible in the view region 902.

In some embodiments, the wearable computing device may be configured to receive UI-targeted movement data corresponding to, for example, an upward movement of the wearable computing device to a position above the first position. In these embodiments, the wearable computing device may, in response to receiving the movement data corresponding to the upward movement, cause one or both of the view region 902 and the menu 904 to move such that the menu 904 becomes more visible in the view region 902. For example, the wearable computing device may cause the view region 902 to move upward and may cause the menu 904 to move downward. The view region 902 and the menu 904 may move the same amount, or may move different amounts. In one embodiment, the menu 904 may move further than the view region 902. As another example, the wearable computing device may cause only the menu 904 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 922 described above in connection with FIG. 9A. In some embodiments, the movement data may comprise a binary indication corresponding to the upward movement. In other embodiments, the movement data may comprise an indication corresponding to the upward movement as well as an extent of the upward movement. The movement data may take other forms as well.

FIG. 9B shows aspects of an example user-interface after receiving movement data corresponding to an upward movement. As shown, the user-interface 900 includes the view region 902 and the menu 904.

As noted above, in response to receiving the movement data corresponding to an upward movement of the wearable computing device, the wearable computing device may move one or both of the view region 902 and the menu 904 such that the menu 904 becomes more visible in the view region 902.

As shown, the menu 904 is fully visible in the view region 902. In other embodiments, however, only a portion of the menu 904 may be visible in the view region 902. In some embodiments, the extent to which the menu 904 is visible in the view region 902 may be based at least in part on an extent of the upward movement.

Thus, the view region 902 may be moved in response to receiving data corresponding to an upward movement. In some embodiments, the view region 902 may be moved in an upward scrolling or panning motion. For instance, the view region 902 may appear to a wearer of the wearable computing device as if mapped onto the inside of a static sphere centered at the wearable computing device, and movement of the view region 902 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 902 may be moved by, for example, jumping between fields of view. In still other embodiments, the view region 902 may be moved only when the upward movement exceeds a threshold speed, acceleration, and/or magnitude. In response to receiving data corresponding to an upward movement that exceeds such a threshold or thresholds, the view region 902 may pan, scroll, slide, or jump to a new field of view. The view region 902 may be moved in other manners as well.

While the foregoing description focused on upward movement, it is to be understood that the wearable computing device could be configured to receive data corresponding to other directional movement (e.g., downward, leftward, rightward, etc.) as well, and that the view region 902 may be moved in response to receiving such data in a manner similar to that described above in connection with upward movement.

As shown, the menu 904 includes a number of content objects 906. In some embodiments, the content objects 906 may be arranged in a ring (or partial ring) around and above the head of a wearer of the wearable computing device. In other embodiments, the content objects 906 may be arranged in a dome-shape above the wearer's head. The ring or dome may be centered above the wearable computing device and/or the wearer's head. In other embodiments, the content objects 906 may be arranged in other ways as well.

The number of content objects 906 in the menu 904 may be fixed or may be variable. In embodiments where the number is variable, the content objects 906 may vary in size according to the number of content objects 906 in the menu 904. In embodiments where the content objects 906 extend circularly around a wearer's head, like a ring (or partial ring), only some of the content objects 906 may be visible at a particular moment. In order to view other content objects 904, a wearer of the wearable computing device may interact with the wearable computing device to, for example, rotate the content objects 906 along a path (e.g., clockwise or counterclockwise) around the wearer's head. To this end, the wearable computing device may be configured to receive data indicating such an interaction through, for example, a touch pad, such as finger-operable touch pad 924. Alternatively or additionally, the wearable computing device may be configured to receive such data through other input devices as well.

Depending on the application of the wearable computing device, the content objects 906 may take several forms. For example, the content objects 906 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 906 may take other forms as well.

In embodiments where the content objects 906 include tools, the tools may be located in a particular region of the menu 904, such as the center. In some embodiments, the tools may remain in the center of the menu 904, even if the other content objects 906 rotate, as described above. Tool content objects may be located in other regions of the menu 904 as well.

The particular content objects 906 that are included in menu 904 may be fixed or variable. For example, the content objects 906 may be preselected by a wearer of the wearable computing device. In another embodiment, the content objects 906 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 906 may fixed, while the content objects 906 may be variable. The content objects 906 may be selected in other manners as well.

Similarly, an order or configuration in which the content objects 906 are displayed may be fixed or variable. In one embodiment, the content objects 906 may be pre-ordered by a wearer of the wearable computing device. In another embodiment, the content objects 906 may be automatically ordered based on, for example, how often each content object 906 is used (on the wearable computing device only or in other contexts as well), how recently each content object 906 was used (on the wearable computing device only or in other contexts as well), an explicit or implicit importance or priority ranking of the content objects 906, and/or other criteria.

In some embodiments, the wearable computing device may be further configured to receive from the wearer a selection of a content object 906 from the menu 904. To this end, the user-interface 900 may include a cursor 908, shown in FIG. 9B as a reticle, which may be used to navigate to and select content objects 906 from the menu 904. In some embodiments, the cursor 908 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 922, or may be included in a diagonal device communicatively coupled to the wearable computing device. As another example, the selection data may be (or may be derived from) data received from a touch pad, such as the finger-operable touch pad 924 described above in connection with FIG. 9A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or diagonal device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner).

Alternatively or additionally, the predetermined movements may involve a predetermined movement of a diagonal device communicatively coupled to the wearable computing device. The diagonal device may similarly be wearable by a wearer of the wearable computing device, such that the movement of the diagonal device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 908 to the content object 906 using one or more predetermined movements. In order to select the content object 906, the wearer may perform an additional predetermined movement, such as holding the cursor 908 over the content object 906 for a predetermined period of time. The wearer may select the content object 906 in other manners as well.

Once a content object 906 is selected, the wearable computing device may cause the content object 906 to be displayed in the view region 902 as a selected content object. FIG. 9C shows aspects of an example user-interface after selection of a selected content object, in accordance with an embodiment.

As indicated by the dotted arrow, the content object 906 is displayed in the view region 902 as a selected content object 910. As shown, the selected content object 910 is displayed larger and in more detail in the view region 902 than in the menu 904. In other embodiments, however, the selected content object 910 could be displayed in the view region 902 smaller than or the same size as, and in less detail than or the same detail as, the menu 904. In some embodiments, additional content (e.g., actions to be applied to, with, or based on the selected content object 910, information related to the selected content object 910, and/or modifiable options, preferences, or parameters for the selected content object 910, etc.) may be showed adjacent to or nearby the selected content object 910 in the view region 902.

Once the selected content object 910 is displayed in the view region 902, a wearer of the wearable computing device may interact with the selected content object 910. For example, as the selected content object 910 is shown as an email inbox, the wearer may wish to read one of the emails in the email inbox. Depending on the selected content object, the wearer may interact with the selected content object in other ways as well (e.g., the wearer may locate additional information related to the selected content object 910, modify, augment, and/or delete the selected content object 910, etc.). To this end, the wearable computing device may be further configured to receive input data corresponding to one or more predetermined movements indicating interactions with the user-interface 900. The input data may take any of the forms described above in connection with the selection data.

FIG. 9D shows aspects of an example user-interface after receiving input data corresponding to a user input, in accordance with an embodiment. As shown, a wearer of the wearable computing device has navigated the cursor 908 to a particular subject line in the email inbox and selected the subject line. As a result, the email 912 is displayed in the view region, so that the wearer may read the email 912. The wearer may interact with the user-interface 900 in other manners as well, depending on, for example, the selected content object.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

We claim:

1. A computer-implemented method, comprising:
at a computing system associated with a head-mountable display, receiving head-movement data indicative of head movement;
determining that at least a portion of the head-movement data corresponds to non-UI-targeted head movements, wherein one or more sensitivity parameters are used to distinguish between UI-targeted head movements and the non-UI-targeted head movements;
using (1) one or more context signals and (2) at least the portion of the head-movement data corresponding to the non-UI-targeted head movements to determine a first activity associated with the head-mountable display;

determining a head-movement interpretation scheme corresponding to the first activity, wherein determining the head-movement interpretation scheme comprises determining a first value for at least one sensitivity parameter used to distinguish between the UI-targeted head movements and the non-UI-targeted head movements;

applying the determined head-movement interpretation scheme to determine the received head-movement data corresponds to one or more UI commands; and providing the one or more UI commands for at least one function of the head-mountable display;

wherein the first value for the at least one sensitivity parameter maps a given amount of received head-movement data to the non-UI-targeted head movements, and wherein determining the head-movement interpretation scheme based on the first activity comprises:

adjusting the first value to a different value for the at least one sensitivity parameter corresponding to the first activity;

based on the different value, modifying the given amount of head-movement data mapped to the non-UI-targeted head movements; and determining a second activity using the modified head-movement data mapped to the non-UI-targeted head movements.

2. The method of claim 1, wherein the first value for the at least one sensitivity parameter is used to adjust one or more sensors, and wherein the one or more sensors provide at least one context signal to determine a second activity associated with the head-mountable device.

3. The method of claim 2, wherein using the one or more context signals to determine the second activity associated with the head-mountable device comprises:

obtaining translational and rotational data; and using the translational and rotational data to determine the second activity associated with the head-mountable device.

4. The method of claim 1, wherein the one or more context signals are based on the head-movement data.

5. The method of claim 1, wherein the first value for the at least one sensitivity parameter maps a given amount of the received head-movement data to the UI-targeted head movements, and wherein determining the head-movement interpretation scheme based on the first activity comprises:

adjusting the first value to a second value for the at least one sensitivity parameter corresponding to the first activity;

based on the second value, modifying the given amount of head-movement data mapped to the UI-targeted head movements; and determining the head-movement interpretation scheme using the modified head-movement data mapped to the UI-targeted head movements.

6. The method of claim 1, wherein determining the head-movement interpretation scheme that corresponds to the first activity comprises:

determining an amount of virtual movement that corresponds to a particular amount of head movement; and providing a visual representation of the amount of virtual movement.

7. The method of claim 1, wherein the one or more context signals comprise one or more of: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with a user-profile, (u) information accessible via a user's social networking account, (v) noise level or any recognizable sounds detected by a device, (w) devices that are currently available to the head-mountable device, (x) devices in proximity to the head-mountable device, (y) devices that are able to communicate with the head-mountable device, (z) information derived from cross-referencing any two or more of: information on the user's calendar, information available via the user's social networking account, and/or other context signals or sources of context information, (aa) health statistics or characterizations of the user's current health, (bb) a user's recent context as determined from sensors on or near the user and/or other sources of context information, (cc) a current location, (dd) a past location, and (ee) a future location.

8. The method of claim 1, wherein determining the head-movement interpretation scheme that corresponds to the first activity comprises:

mapping the first activity to a corresponding head-movement interpretation scheme using an activity-to-interpretation-scheme database.

9. A system, comprising:

a head-mountable display, wherein the system is configured for:

receiving head-movement data from the head-mountable display indicative of head movement;

determining that at least a portion of the head-movement data corresponds to non-UI-targeted head movements, wherein one or more sensitivity parameters are used to distinguish between UI-targeted head movements and the non-UI-targeted head movements;

using (1) one or more context signals and (2) at least the portion of the head-movement data corresponding to the non-UI-targeted head movements to determine a first activity associated with the head-mountable display;

determining a head-movement interpretation scheme corresponding to the first activity, wherein determining the head-movement interpretation scheme comprises determining a first value for at least one sensitivity parameter used to distinguish between the UI-targeted head movements and the non-UI-targeted head movements; and applying the determined head-movement interpretation scheme to determine the received head-movement data corresponds to one or more UI commands; and providing the one or more UI commands for at least one function of the head-mountable display;

wherein the first value for the at least one sensitivity parameter maps a given amount of received head-movement data to the non-UI-targeted head movements, and wherein determining the head-movement interpretation scheme based on the first activity comprises:

adjusting the first value to a different value for the at least one sensitivity parameter corresponding to the first activity; and based on the different value, modifying the given amount of head-movement data mapped to the non-UI-targeted head movements; and determining a second activity using the modified head-movement data mapped to the non-UI-targeted head movements.

10. The system of claim 9, wherein the first value for the at least one sensitivity parameter is used to adjust one or more sensors, and wherein the one or more sensors provide at least one context signal used to determine a second activity associated with the head-mountable device.

11. The system of claim 10, wherein using the one or more context signals to determine the second activity that is associated with the head-mountable display comprises:
   obtaining translational and rotational data; and
   using the translational and rotational data to determine the second activity associated with the head-mountable device.

12. The system of claim 9, wherein the one or more context signals are based on the head-movement data.

13. The system of claim 9, wherein the first value for the at least one sensitivity parameter maps a given amount of the received head-movement data to the UI-targeted head movements, and wherein determining the head-movement interpretation scheme based on the first activity comprises:
   adjusting the first value to a second value for the at least one sensitivity parameter corresponding to the first activity;
   based on the second value, modifying the given amount of head-movement data mapped to the UI-targeted head movements; and
   determining the head-movement interpretation scheme using the modified head-movement data mapped to the UI-targeted head movements.

14. The system of claim 9, wherein determining the head-movement interpretation scheme that corresponds to the first activity comprises:
   determining an amount of virtual movement that corresponds to a particular amount of head movement; and
   providing a visual representation of the amount of virtual movement.

15. The system of claim 9, wherein the one or more context signals comprise one or more of: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with a user-profile, (u) information accessible via a user's social networking account, (v) noise level or any recognizable sounds detected by a device, (w) devices that are currently available to the head-mountable device, (x) devices in proximity to the head-mountable device, (y) devices that are able to communicate with the head-mountable device, (z) information derived from cross-referencing any two or more of: information on the user's calendar, information available via the user's social networking account, and/or other context signals or sources of context information, (aa) health statistics or characterizations of the user's current health, (bb) a user's recent context as determined from sensors on or near the user and/or other sources of context information, (cc) a current location, (dd) a past location, and (ee) a future location.

16. The system of claim 9, wherein determining the head-movement interpretation scheme that corresponds to the first activity comprises:
   mapping the first activity to a corresponding head-movement interpretation scheme using an activity-to-interpretation-scheme database.

17. A wearable-computing system, comprising:
   a processor; and
   a non-transitory computer-readable medium configured to store at least program instructions that, when executed by the processor, cause the wearable-computing system to carry out functions comprising:
      receiving head-movement data indicative of head movement;
      determining that at least a portion of the head-movement data corresponds to non-UI-targeted head movements, wherein one or more sensitivity parameters are used to distinguish between UI-targeted head movements and the non-UI-targeted head movements, and wherein:
         determining the head-movement interpretation scheme comprises determining a first value for at least one sensitivity parameter used to distinguish between UI-targeted head movements and the non-UI-targeted head movements;
      using (1) one or more context signals and (2) at least the portion of the head-movement data corresponding to the non-UI-targeted head movements as a basis for determining a first activity that is associated with the wearable-computing system;
      determining a head-movement interpretation scheme corresponding to the first activity; and
      applying the determined head-movement interpretation scheme to determine the received head-movement data corresponds to one or more UI commands; and
      communicating the one or more UI commands;
   wherein the first value for the at least one sensitivity parameter maps a given amount of received head-movement data to the non-UI-targeted head movements, and wherein determining the head-movement interpretation scheme based on the first activity comprises:
      adjust the first value to a different value for the at least one sensitivity parameter corresponding to the first activity; and
      based on the different value, modify the given amount of head-movement data mapped to the non-UI-targeted head movements; and
      determining a second activity using the modified head-movement data mapped to the non-UI-targeted head movements.

18. The wearable-computing system of claim 17, further comprising one or more sensors, wherein the first value for the at least one sensitivity parameter is used to adjust the one or more sensors, and wherein the functions further comprise requesting that the one or more sensors provide at least one context signal to determine a second activity associated with the wearable-computing system.

19. The wearable-computing system of claim 18, wherein determining second the activity associated with the wearable-computing system comprises:
   obtaining translational and rotational data from the one or more sensors; and
   use the translational and rotational data to determine the second activity associated with the wearable-computing system.

20. The wearable-computing system of claim 17, wherein the one or more context signals are based on the head-movement data.

21. The wearable-computing system of claim 17, wherein the first value for the at least one sensitivity parameter maps a given amount of the received head-movement data to the UI-targeted head movements, and wherein determining the head-movement interpretation scheme based on the first activity comprises:
- adjusting the first value to a second value for the at least one sensitivity parameter corresponding to the first activity;
- based on the second value, modifying the given amount of head-movement data mapped to the UI-targeted head movements; and
- determining the head-movement interpretation scheme using the modified head-movement data mapped to the UI-targeted head movements.

22. The wearable-computing system of claim 17, wherein determining the head-movement interpretation scheme that corresponds to the first activity comprises:
- determining an amount of virtual movement that corresponds to a particular amount of head movement; and
- provide a visual representation of the amount of virtual movement.

23. The wearable-computing system of claim 17, wherein the one or more context signals comprise one or more of: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with a user-profile, (u) information accessible via a user's social networking account, (v) noise level or any recognizable sounds detected by a device, (w) devices that are currently available to the head-mountable device, (x) devices in proximity to the head-mountable device, (y) devices that are able to communicate with the head-mountable device, (z) information derived from cross-referencing any two or more of: information on the user's calendar, information available via the user's social networking account, and/or other context signals or sources of context information, (aa) health statistics or characterizations of the user's current health, (bb) a user's recent context as determined from sensors on or near the user and/or other sources of context information, (cc) a current location, (dd) a past location, and (ee) a future location.

24. The wearable-computing system of claim 17, wherein determining the head-movement interpretation scheme that corresponds to the first activity comprises mapping the first activity to a corresponding head-movement interpretation scheme using an activity-to-interpretation-scheme database.

* * * * *